United States Patent
Diaz et al.

(10) Patent No.: US 10,450,116 B2
(45) Date of Patent: Oct. 22, 2019

(54) TAGGED PRODUCTS AND TRACKING THEREOF USING CUSTOMIZABLE DATA POINTS

(71) Applicant: INTEGRATED LINER TECHNOLOGIES, INC., Rensselaer, NY (US)

(72) Inventors: Lenny Diaz, Clifton Park, NY (US); Paul M. Petrosino, Schoharie, NY (US)

(73) Assignee: INTEGRATED LINER TECHNOLOGIES, INC., Rensselaer, NY (US)

( * ) Notice: Subject to any disclaimer, the term of this patent is extended or adjusted under 35 U.S.C. 154(b) by 179 days.

(21) Appl. No.: 15/612,020

(22) Filed: Jun. 2, 2017

(65) Prior Publication Data

US 2017/0305620 A1   Oct. 26, 2017

Related U.S. Application Data

(63) Continuation of application No. PCT/US2015/063590, filed on Dec. 3, 2015, which is a continuation of application No. 14/570,421, filed on Dec. 15, 2014, now Pat. No. 10,035,631.

(60) Provisional application No. 62/088,206, filed on Dec. 5, 2014.

(51) Int. Cl.
*G08B 21/24* (2006.01)
*B65D 51/24* (2006.01)
*B65D 41/02* (2006.01)
*B65D 51/18* (2006.01)
*G06Q 10/08* (2012.01)

(52) U.S. Cl.
CPC .......... *B65D 51/245* (2013.01); *B65D 41/02* (2013.01); *B65D 51/18* (2013.01); *G06Q 10/087* (2013.01); *B65D 2251/009* (2013.01); *B65D 2251/0015* (2013.01); *B65D 2251/0028* (2013.01); *B65D 2251/0093* (2013.01)

(58) Field of Classification Search
CPC .............................. G08B 21/24; B65D 51/24
USPC .................... 340/687, 572.1, 568.1
See application file for complete search history.

(56) References Cited

U.S. PATENT DOCUMENTS

| | | |
|---|---|---|
| 7,772,981 B1 | 8/2010 | Lambert |
| 7,973,664 B1 | 7/2011 | Lambert |
| 8,177,762 B2 | 5/2012 | Beasley |
| 8,608,713 B2 | 12/2013 | Beasley |

(Continued)

FOREIGN PATENT DOCUMENTS

WO   2007079024 A2   7/2007

OTHER PUBLICATIONS

"ViziCore: Embedded RFID Technology for OEMs & Manufacturers", http://www.vizinexrfid.com/vizicore/.

(Continued)

*Primary Examiner* — Oluseye Iwarere
(74) *Attorney, Agent, or Firm* — Matthew M. Hulihan; Heslin Rothenberg Farley & Mesiti PC

(57) ABSTRACT

Container top assemblies and methods of fabrication thereof are provided. Product management and tracking of data for customizable data points is further provided. A container top assembly can include a cap comprising a central hole and a plurality of openings, a liner, and a radio frequency identification (RFID) tag embedded at least partially within the container top assembly.

16 Claims, 27 Drawing Sheets

(56) References Cited

U.S. PATENT DOCUMENTS

| | | | |
|---|---|---|---|
| 8,976,029 B1* | 3/2015 | McTigue | G06Q 10/087 340/572.1 |
| 2003/0061705 A1 | 4/2003 | Smeyak et al. | |
| 2003/0179151 A1 | 9/2003 | Senba | |
| 2005/0051624 A1 | 3/2005 | Kipp | |
| 2005/0128087 A1 | 6/2005 | Claessens | |
| 2005/0242957 A1* | 11/2005 | Lindsay | G06K 19/0716 340/572.7 |
| 2005/0266494 A1 | 12/2005 | Hodge | |
| 2006/0132351 A1 | 6/2006 | Le Sesne | |
| 2006/0145870 A1 | 7/2006 | Coyeley | |
| 2006/0213964 A1 | 9/2006 | Excoffier et al. | |
| 2006/0224129 A1 | 10/2006 | Beasley | |
| 2006/0238341 A1* | 10/2006 | Commagnac | B65D 55/02 340/568.1 |
| 2006/0283945 A1 | 12/2006 | Excoffier | |
| 2006/0290471 A1 | 12/2006 | Van Alstyne | |
| 2007/0152829 A1* | 7/2007 | Lindsay | G06K 19/0717 340/572.3 |
| 2007/0182563 A1 | 8/2007 | Abbott | |
| 2007/0194019 A1 | 8/2007 | Seagle et al. | |
| 2007/0296599 A1 | 12/2007 | Wang | |
| 2008/0149574 A1 | 6/2008 | Read | |
| 2008/0245791 A1 | 10/2008 | Atherton | |
| 2008/0314900 A1 | 12/2008 | Biesecker et al. | |
| 2009/0033495 A1 | 2/2009 | Abraham et al. | |
| 2009/0045963 A1 | 2/2009 | Vigneron | |
| 2009/0065466 A1 | 3/2009 | Petrosino et al. | |
| 2010/0000960 A1 | 1/2010 | Anderson | |
| 2010/0007464 A1* | 1/2010 | McTigue | G06Q 10/087 340/10.1 |
| 2010/0108633 A1 | 5/2010 | Chen et al. | |
| 2010/0219190 A1 | 9/2010 | Mineo | |
| 2011/0263461 A1 | 10/2011 | Kastury et al. | |
| 2011/0288503 A1 | 11/2011 | Magalich et al. | |
| 2012/0187197 A1* | 7/2012 | Masin | G06K 19/07758 235/492 |
| 2012/0217244 A1 | 8/2012 | Phaneuf et al. | |
| 2012/0226244 A1 | 9/2012 | Beasley | |
| 2012/0227860 A1* | 9/2012 | Jeremiah | B65D 1/0292 141/1 |
| 2013/0316442 A1* | 11/2013 | Meurville | C12M 41/00 435/287.5 |
| 2013/0333873 A1 | 12/2013 | Giroux et al. | |
| 2014/0100534 A1 | 4/2014 | Beasley | |
| 2014/0266760 A1* | 9/2014 | Burke, Jr. | G08B 21/24 340/687 |

OTHER PUBLICATIONS

Smart Test Tube, http://www.smartmedtech.com/products/product1.php.

"RFID Microtube: Intelligent Microtube", http://biz.maxell.com/en/product_security/?pci=7&pn=sp0012.

Ahmed Elamin, "NEC Succeeds in Embedding RFID in Bottle Cap", Mar. 22, 2007, http://www.foodproductiondaily.com/Supply-Chain/NEC-succeeds-in-embedding-RFID-in-bottle-cap.

Randy Stigall, "Integrating RFID With Plastic Products and Packaging", NPE 2006 Education Program, Jun. 6, 2006, https://www.plasticsindustry.org/files/industry/scitech/rfid/rfid-stigall-062206.pdf.

"Michelin Embeds RFID Tags in Tires", RFID Journal, http://www.rtidjournal.com/articles/view?269.

"RFID Asset Management", http://www.radiantrfid.com/laboratories.html.

"Fraction Collectors", http://www.isco.com/WebProductFiles/Product_Literature/101/Fraction_Collectors/Fraction_Collector_Brochure.pdf.

RFID for Laboratory Samples Inventory, https://www.youtube.com/watch?v=emVkQhTAhtY.

FreezerPro—Laboratory Sample Inventory and Management Solution, https://www.youtube.com/watch?v=M4mEXqiYWyM&hd=1).

Office Action in U.S. Appl. No. 14/570,421, dated Apr. 12, 2016, pp. 1-11.

Office Action in U.S. Appl. No. 14/570,421, dated Oct. 25, 2016, pp. 1-12.

International Search Report in Application No. PCT/US15/63590, dated Mar. 30, 2016, pp. 1-8.

Office Action in U.S. Appl. No. 14/570,421, dated Jul. 3, 2017, pp. 1-9.

Office Action in U.S. Appl. No. 14/570,421, dated Dec. 11, 2017, 8 pgs.

* cited by examiner

FIG. 19

Smart Septa

| Sample Customer | RFID Data |
|---|---|
| Site Admin | Product: 96 well cap mat |
| Customers | Grid Row: 1 |
| Users | Grid Column: 1 |
| Products | contents: |
| Scan RFID | filldate: |
| Logout | plate id: |

Cancel | Save Smart Tag Data

TAGGED PRODUCTS AND TRACKING THEREOF USING CUSTOMIZABLE DATA POINTS

CROSS-REFERENCE TO RELATED APPLICATION

This application claims priority to PCT Patent Application Number PCT/US2015/063590 filed Mar. 12, 2015 and entitled "TAGGED PRODUCTS AND TRACKING THEREOF USING CUSTOMIZABLE DATA POINTS", which claims priority to U.S. Provisional Patent Application No. 62/088,206 filed Dec. 5, 2014 and entitled "TAGGED PRODUCTS AND TRACKING THEREOF USING CUSTOMIZABLE DATA POINTS" and U.S. Nonprovisional patent application Ser. No. 14/570,421 filed Dec. 15, 2014 and entitled "TAGGED PRODUCTS AND TRACKING THEREOF USING CUSTOMIZABLE DATA POINTS", all three of which are hereby incorporated herein by reference in their entirety.

BACKGROUND

It is important in various material handling processes to identify and record aspects about an enclosure, including the material(s) it contains. Barcodes or other identifying marks are commonly placed on the enclosures, for instance on a cap or crimp thereof. However, exposure of the identifying marks to the surrounding environment can affect their integrity due to peeling, smudging, smearing, tearing, and other destructive occurrences. Furthermore the ability to remove, change, or replace the identifying mark can lead to mislabeling through human error. These shortcomings and others render these types of identifying marks unable to effectively provide a suitable means of identifying the enclosure and/or its contents.

BRIEF SUMMARY

Shortcomings of the prior art are overcome and additional advantages are provided through the provision of a container top assembly that includes a cap comprising a central hole and a plurality of openings; a liner; and a radio frequency identification (RFID) tag embedded at least partially within the container top assembly. The container top assembly may be for sealing a container.

Additional features and advantages are realized through the concepts of aspects described herein. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 19 depicts an example interface for viewing or entering data about a product for data points defined by a product template corresponding to the product, in accordance with aspects described herein;

FIGS. 20-21 depict example interfaces to view or enter data about a grid product for data points defined by a product template corresponding to the grid product, in accordance with aspects described herein;

DETAILED DESCRIPTION

Figure 1A:
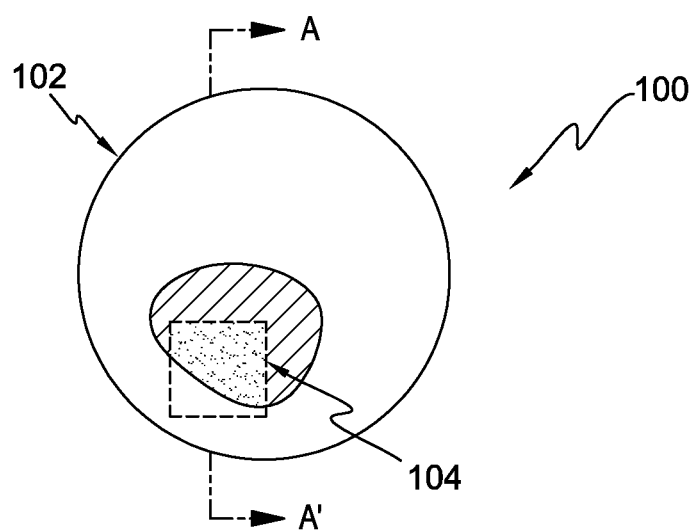
FIGS. 1A-1E depict an example of a membrane having an embedded Radio Frequency Identification tag, the membrane for use with a container top assembly in accordance with aspects described herein.

Aspects described herein provide a customizable product management and tracking portal, along with corresponding products to facilitate maintenance of data about those products and their contents. As noted above, conventional approaches have put barcodes or other identifying marks on the tops or sides of materials and/or products containing those materials. This practice has drawbacks. The marks can be time-consuming to scan or read, can fall off, become torn, smudged or otherwise damaged and difficult to read or unreadable. Even solutions that have placed Radio Frequency Identification (RFID) tags/stickers on the outside of a container can be problematic, for instance when a corrosive or other destructive material comes into contact with the tag.

Aspects described herein disclose container top assemblies and liners having an RFID tag embedded directly into the material. Example container top assemblies include cap mats (also referred to herein as well-plate covers) and caps (screw or crimp, as examples) used to seal containers of material. These container top assemblies may include liner(s) having septa or other membranes through which access to material(s) contained by the containers may be accessed.

The container top assembly is provided with an RFID tag, for instance in a liner or septum of the container top assembly, and tracking features are provided that are robust and scalable to a customer's current and future data tracking needs. Embedding that RFID tag into material of the container top assembly (for instance the silicone membrane of the septa liner material) protects the integrity of the RFID tag, and the tag is permanently associated with the liner or container top assembly. The tag, which effectively serves as an identifying marker for the container top/container used with the top, will not degrade or breakdown when exposed to the possibly-harsh elements of the customer's application. This is in contrast to traditional approaches that place a barcode, for instance, on the outside of the container.

Tracking of container top assemblies as described herein is provided through a dynamic product management and tracking web portal that adjusts to individual or customer needs because it is customizable and dynamic. Customers can create any number of data points (may also be referred to synonymously herein as "properties") for which data about a product are to be maintained, across a variety of available data types (such as String, Boolean, Date, Integer, Decimal, and File) within the system (the "File" data point type refers to the ability to upload a file (e.g. .pdf, .xls, .csv, .txt, .xml, as examples) and match it to a record. This accommodates the customer's particularized data collection and data tracking needs.

Proper interfaces to the portal may be provided for various types of internet-accessible devices, such as desktops, laptops, and mobile devices such as tablets and smartphones, making access and use of the portal device-agnostic. Additionally, since the product management and tracking portal may be internet connected, access to, and entry and management of, the custom collected data may be provided and available anywhere and at anytime.

Aspects described herein may advantageously be used in various applications including chromatography, headspace analysis, environmental, diagnostic, pharmaceutical, and chemical packaging, among others.

In accordance with aspects described herein, an RFID tag is embedded into a liner, such as a membrane, to be incorporated into a container top assembly. FIGS. 1A-1E depict an example of such a membrane having an embedded Radio Frequency Identification tag, for use with a container top assembly in accordance with aspects described herein. FIG. 1A presents a top view of liner 100, which includes in this example a membrane 102. Membrane 102 may be any material, and preferably is a material suitable for sealing a container when the membrane is incorporated into a container top assembly, such as a cap, operatively coupled to the container. Example materials of which membrane 102 may be composed include silicone, polytetrafluoroethylene (PTFE), combination PTFE and silicone, butyl, combination PTFE and butyl, aluminum-faced silicone, and/or combination natural rubber and PTFE, as examples. The membrane may function as a septum that is punched/inserted into a container top assembly such as a container cap or crimp, enabling an object such as a needle to pass-through to introduce material into, or extract material from, a container that is capped by the container top assembly and sealed by the liner. By way of specific example, liner 100 may be incorporated into a circular screw-cap with a hole through the top of the cap, in which the cap screws onto the container to create the seal, and contents of the container may be accessed by penetrating the liner.

Figure 1B:
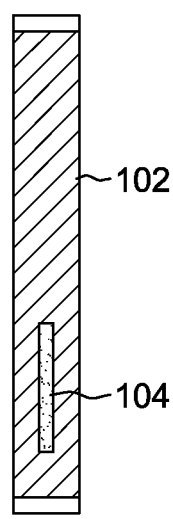

Membrane 102 has embedded therein an RFID tag 104. FIG. 1B depicts a cross-sectional side view of liner 100 taken across line A-A' of FIG. 1A. The example positioning of RFID tag 104 within membrane 102 shows that the RFID tag 104 is completely embedded into liner 100. In other examples, the RFID tag may be only partially embedded within the liner and/or embedded within and between two or more materials of the container top assembly.

Figure 1C:
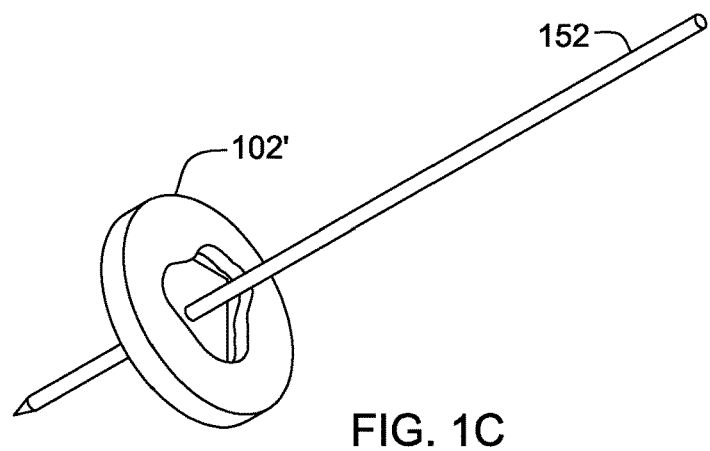
Figure 1D:
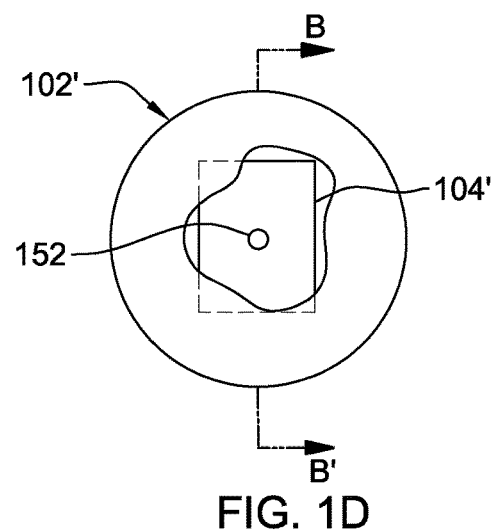
Figure 1E:
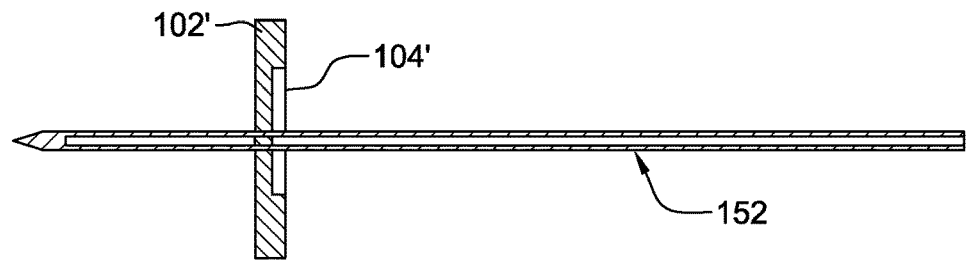

Liner 100 may be designed for penetration by an injection needle or similar instrument, for instance to enable extraction of a material from a container. FIGS. 1C-1E depict this scenario. Specifically, FIG. 1C depicts an isometric view of injection needle 152 penetrating a membrane 102'. FIG. 1D depicts a top view, showing membrane 102', with a partial cutaway to reveal RFID tag 104' embedded therein. The needle 152 is shown penetrating the membrane 102' and embedded RFID tag 104'. FIG. 1E shows a cross-sectional side view taken across line B-B' of FIG. 1D. It is seen that the needle can penetrate the membrane, RFID tag, or (in this example) a combination thereof. In this regard, portions of the RFID tag may be made resilient to such penetration, for instance the antenna of the RFID tag may be designed and/or configured to withstand such penetration.

Figure 2:
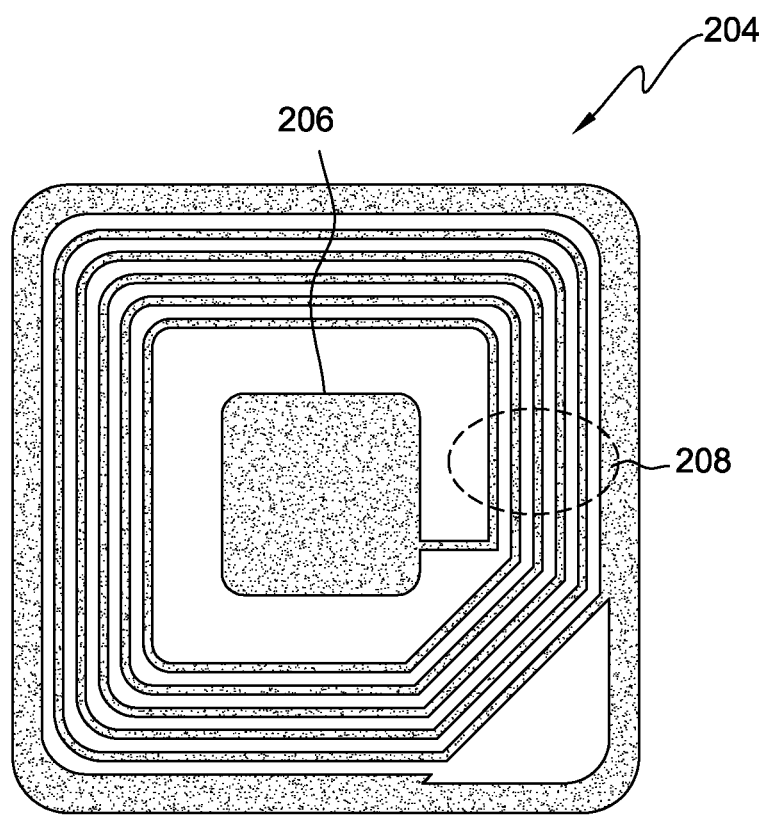
FIG. 2 depicts an example of a Radio Frequency Identification tag for use with aspects described herein.

FIG. 2 depicts an example of a Radio Frequency Identification tag for use with aspects described herein. RFID tag 204 includes chip portion 206 with components that store data and transmit the data when the tag is interrogated with a reader device. RFID tag 204 also includes antenna portion 208 that performs the transmission of the data to the reader, and receives an interrogation signal from the reader. These components are commonly bundled into a packaging or other structure (not pictured) for convenience. The tag may be a passive RFID tag, meaning that it derives enough power from an interrogation signal via the antenna to transmit the data to the reader.

FIG. 2 depicts just one example of an RFID tag, and many others are possible and known. In this example, the antenna encircles the chip portion in a coil configuration. In some other examples, the chip portion 206 is oriented differently with respect to the antenna. For instance, the RFID tag may comprises multiple layers, in which the antenna overlies the chip portion.

Figure 3A:
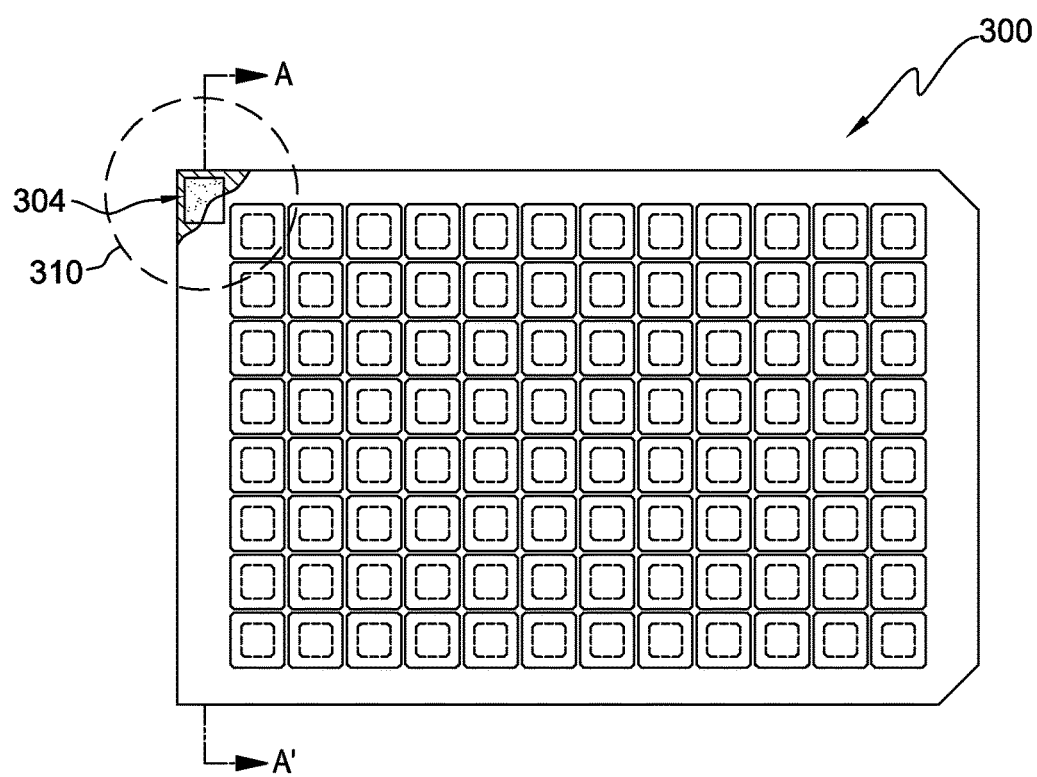
FIGS. 3A-3B depict an example cap mat container top assembly having an embedded Radio Frequency Identification tag, in accordance with aspects described herein.
Figure 3B:
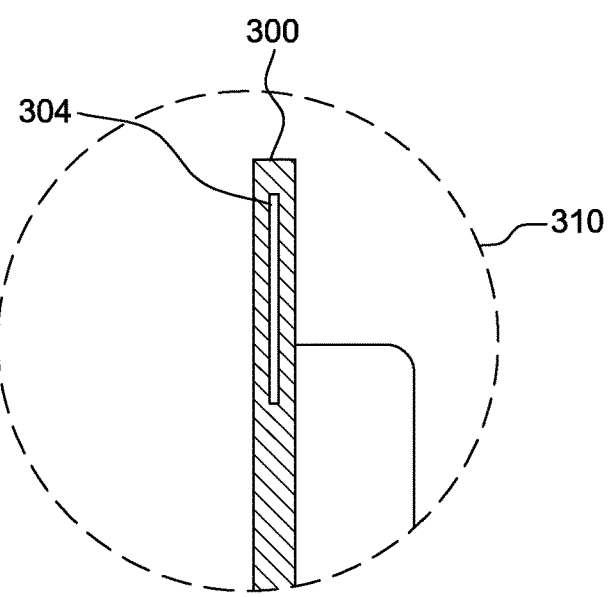

The liner may in other examples be configured as part of a well-plate cover (a cap mat container top assembly) having an embedded RFID tag. FIGS. 3A-3B depict an example cap mat container top assembly having an embedded Radio Frequency Identification tag, in accordance with aspects described herein. Referring to FIG. 3A, cap mat 300 is configured to seal a multi-well plate, in this case a 96-well plate commonly used in laboratory settings. Cap mat 300 may be made at least partially of silicone or other material described above in connection with membrane 102. In the upper left corner of cap mat 300 is an embedded RFID tag 304. A cross-sectional side view of region 310 taken along line B-B' is presented in FIG. 3B, depicting RFID tag embedded into cap mat material 300.

In accordance with further aspects described herein, a dynamic product management and tracking web portal (referred to herein as "portal") is provided, enabling tracking of each RFID tag embedded in a liner or container top assembly, and more importantly facilitating entering, accessing, updating, and viewing data about the product and customizable data points associated with the product or its contents. Tracking of the data point data for a product may occur over time to build a history of use of the particular product, which can be maintained and optionally presented to a user if desired. Advantageously, the combination RFID tagging and portal configuration enable customizable, trackable, dynamically updatable data entry, maintenance, and retrieval from a database.

By way of an interrogation signal received from an RFID reader, a seed number may be correlated to an RFID tag embedded in a liner or container top assembly. The seed number may be a unique number associated with the tag, which itself may be associated with a 'lot' or customer order number of products, and can correlate the RFID EPC (electronic product code) and userdata. In some examples, the seed number is a unique identifier included in the RFID tag and introduced, for instance, as part of the manufacture of the tag.

The liner or container top assembly may be designed for use with a container. A vendor may sell products, which in the context of this disclosure may include a liner, a container top assembly incorporating the liner, and/or a container that has the liner or container top assembly included therewith. The term "product" as used herein therefore refers generically any of these possibilities.

Each product incorporating an RFID tag as described herein may be trained individually, meaning the attributes (data points' or 'properties', used synonymously herein) for which data about the product are collected and maintained may be defined, by a customer/end user for instance, and the actual data for those data points may be entered, accessed, modified, etc. for each tag individually. This is facilitated through the use of a web-based system referred to herein as the portal. Each product (or more particularly, each RFID tag associated with a product) will have corresponding record(s) in a database, the records being web-accessible and housing data about the product, it characteristics, contents, and so forth.

Figure 4:
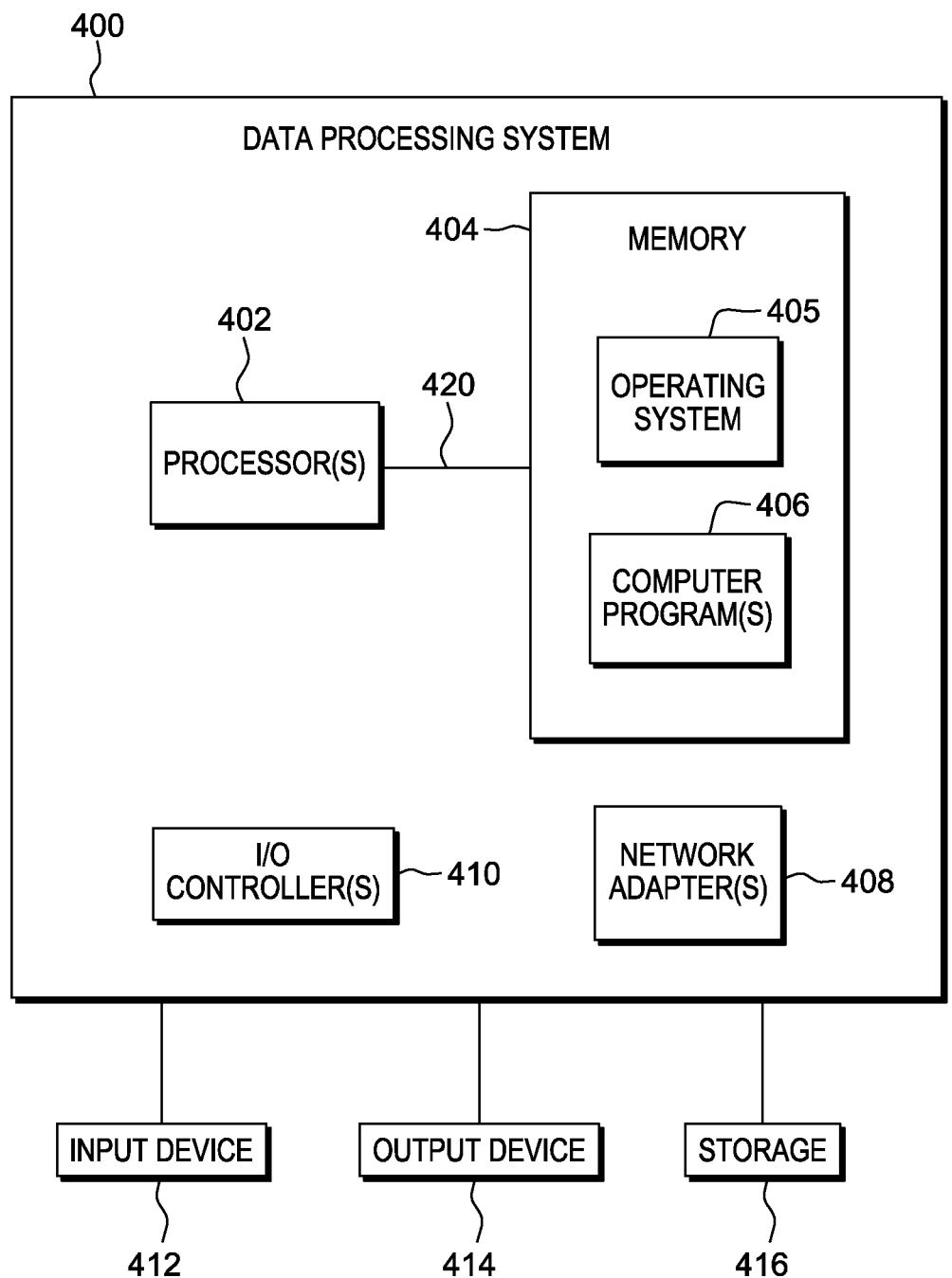
FIG. 4. depicts an example computer system to provide a product management and tracking portal, in accordance with aspects described herein.

The product management and tracking portal may be provided by one or more computer systems, an example of which is depicted and described with reference to FIG. 4. Computer system 400 of FIG. 4 may therefore incorporate aspects described herein. Computer system 400 is suitable for storing and/or executing program code, such as program code for performing processes described herein, and includes at least one processor 402 coupled directly or indirectly to memory 404 through, a bus 420. In operation, processor(s) 402 obtain from memory 404 one or more instructions for execution by the processors. Memory 404 may include local memory employed during actual execution of the program code, bulk storage, and cache memories that provide temporary storage of at least some program code in order to reduce the number of times code must be retrieved from bulk storage during program code execution. A non-limiting list of examples of memory 404 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 404 includes an operating system 405 and computer programs 406, such as one or more programs for providing product management and tracking facilitates and performing other aspects described herein.

Input/Output (I/O) devices 412, 414 (including but not limited to keyboards, displays, pointing devices, etc.) may be coupled to the system either directly or through I/O controllers 410.

Network adapter(s) 408 may also be coupled to the system to enable the computer system to become coupled to other computer systems through intervening private or public networks. Modems, cable modem and Ethernet cards are just a few of the currently available types of network adapters 408. In one example, network adapters 408 facilitate exchange of data with remote devices, for instance data related to the management and tracking of date points for products, as described herein.

Computer system 400 may be coupled to storage 416 (e.g., a non-volatile storage area, such as magnetic disk drives, optical disk drives, a tape drive, etc.), having one or more databases. Storage 416 may include an internal storage device or an attached or network accessible storage. Computer programs in storage 416 may be loaded into memory 404 and executed by a processor 402.

The computer system 400 may include fewer components than illustrated, additional components not illustrated herein, or some combination of the components illustrated and additional components. Computer system 400 may include any computing device known in the art, such as a mainframe, server, personal computer, workstation, laptop, handheld computer, telephony device, network appliance, virtualization device, storage controller, etc.

In addition, processes described herein may be performed by multiple computer systems 400, working as part of a clustered computing environment.

Aspects of a portal are now described with reference to FIGS. 5-21. In these examples, the portal is referred to as Smart Septa. Configuration of Smart Septa includes configuration of "Customers", which each may correspond to an entity within a product supply chain. Smart Septa can provide logical separation between all entities ("customers") within this supply chain, as well as the user accounts and products associated with those entities. By way of specific example, assume that at a top tier, Smart Septa is provided by a manufacturer of septa (or liners comprising septa). The manufacturer offers to its customers various septa and/or liners as part of a variety of different container top assemblies. A given customer of the manufacturer may be a vendor of containers that incorporate these container top assemblies. The vendor itself may have its own customer base of 'end-users', which may be individual laboratories, for instance, that consume the containers and associated container tops.

Users of the Smart Septa system are, for instance, people associated with given customers setup with Smart Septa. Users can configure product templates for various types of products. A product template provides a way for the user to define custom attributes (data points, properties) for which data about a product of that product type are to be maintained, thus allowing the user to define what is tracked with respect to a given product. The data of the various data points may then be entered, viewed, retrieved, updated, etc. using any device that is RFID compliant and has access to the portal and/or its databases. In this manner, and as explained in further detail below, there are generally two access points for accessing the Smart Septa system—a back end by which the system is configured, and a front end by which the Smart Septa data is entered and associated with an RFID tag and via an RFID-capable device.

Figure 5:
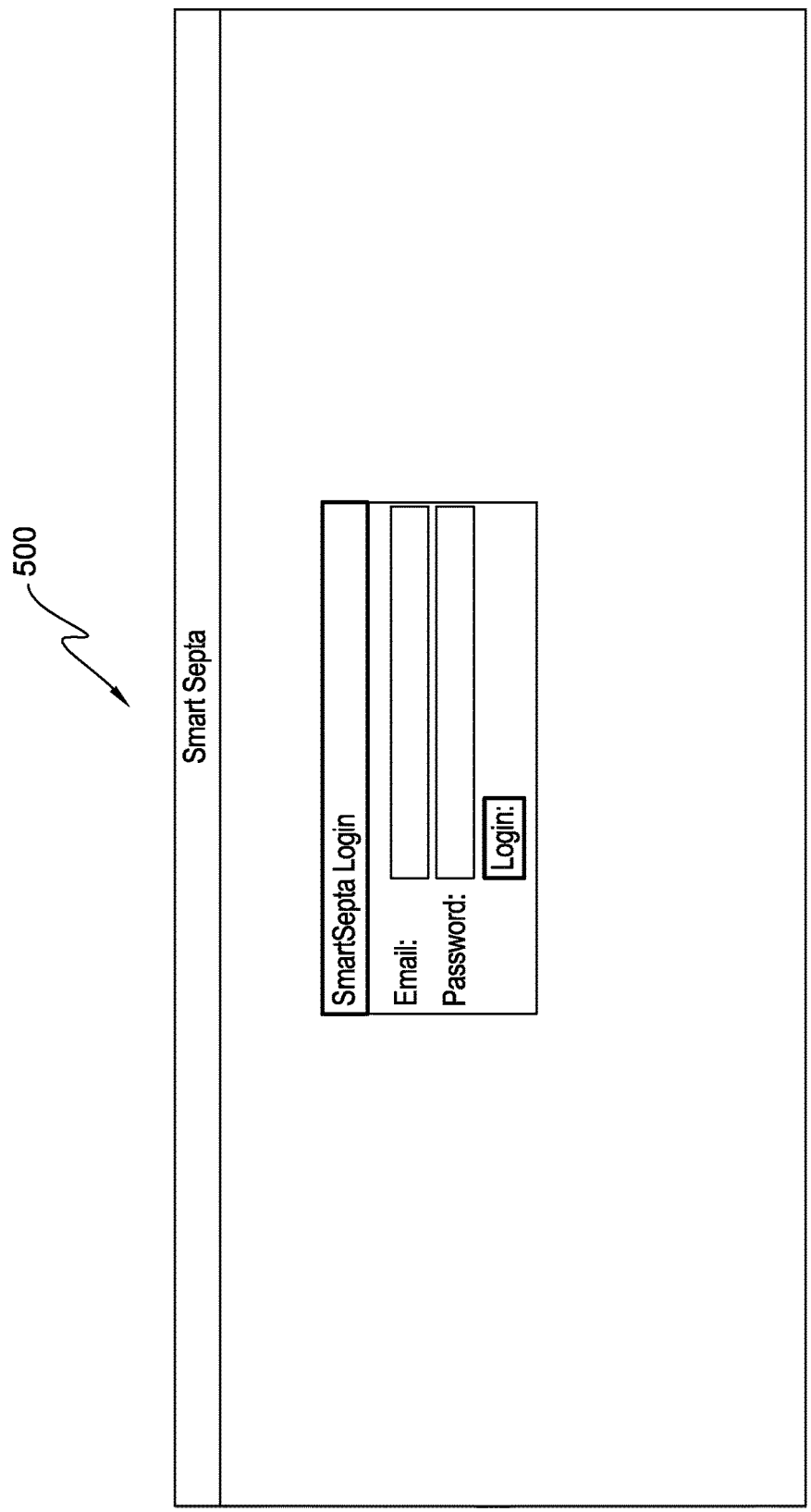
FIGS. 5-10 depict example interfaces through which a user may login to a product management and tracking portal and manage customers and users of the product management and tracking portal, in accordance with aspects described herein.
Figure 6:
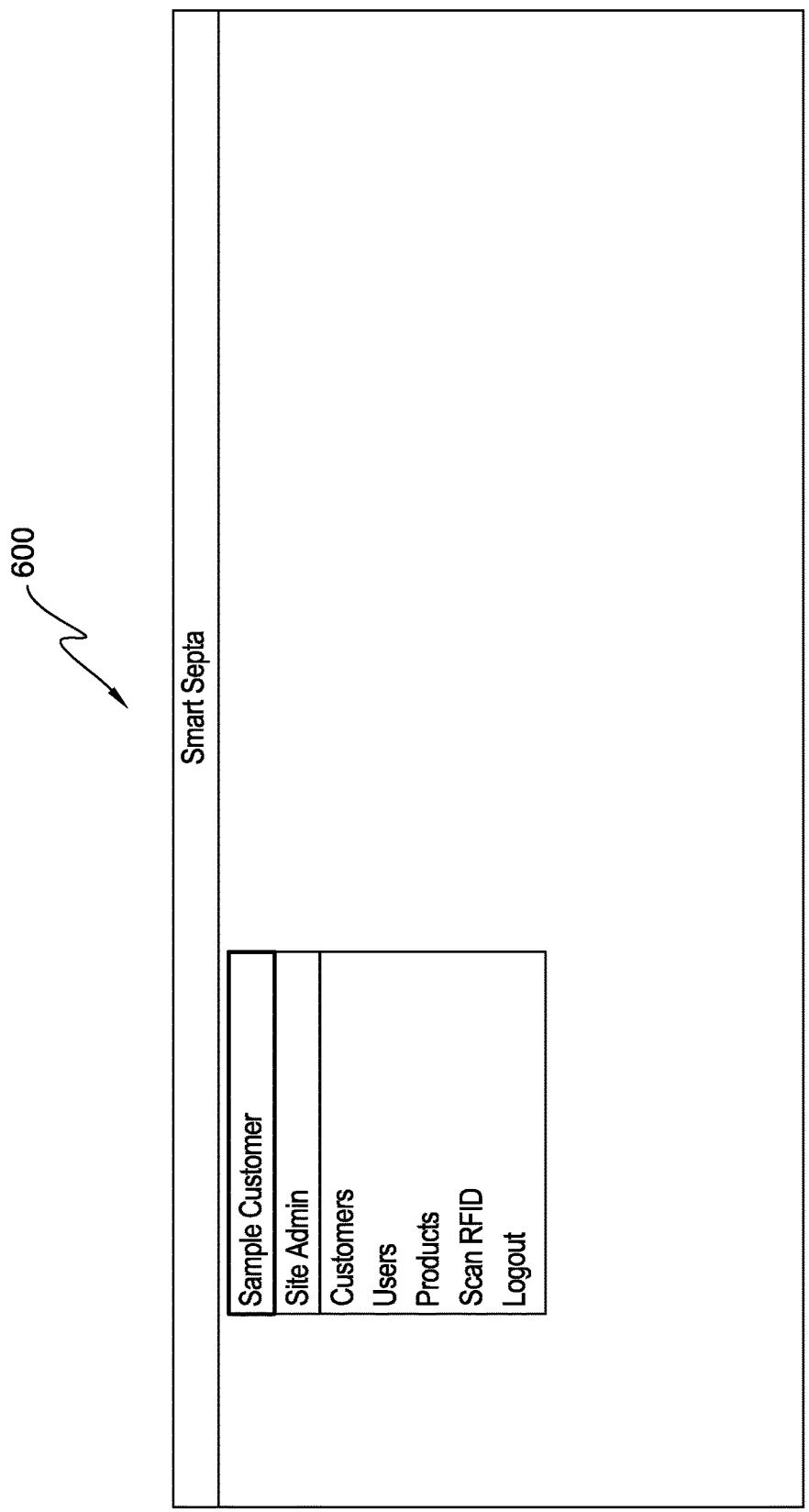

FIGS. 5-10 depict example interfaces through which a user may login to a product management and tracking portal and manage customers and users of the product management and tracking portal, in accordance with aspects described herein. FIG. 5 presents an initial login screen 500 prompting a user for login credentials—in this case an email address and password. The user is able to login, assuming an account for the user has already been configured.

After logging in, the user is presented with a homescreen 600 (FIG. 6) through which various tasks can be performed. These tasks may depend on the user's privileges as an admin, super user, or user, as examples. Admin users can, for instance, add or modify customers, add or modify/configure products, and add or modify users. Admin users and other users can also test and use the products that they have configured. An Admin may have full control over the site setup for its customer, whereas the Super Admin, for instance a septa or liner manufacturer that maintains the portal, may have privileges over all Admins of the portal.

Figure 7:
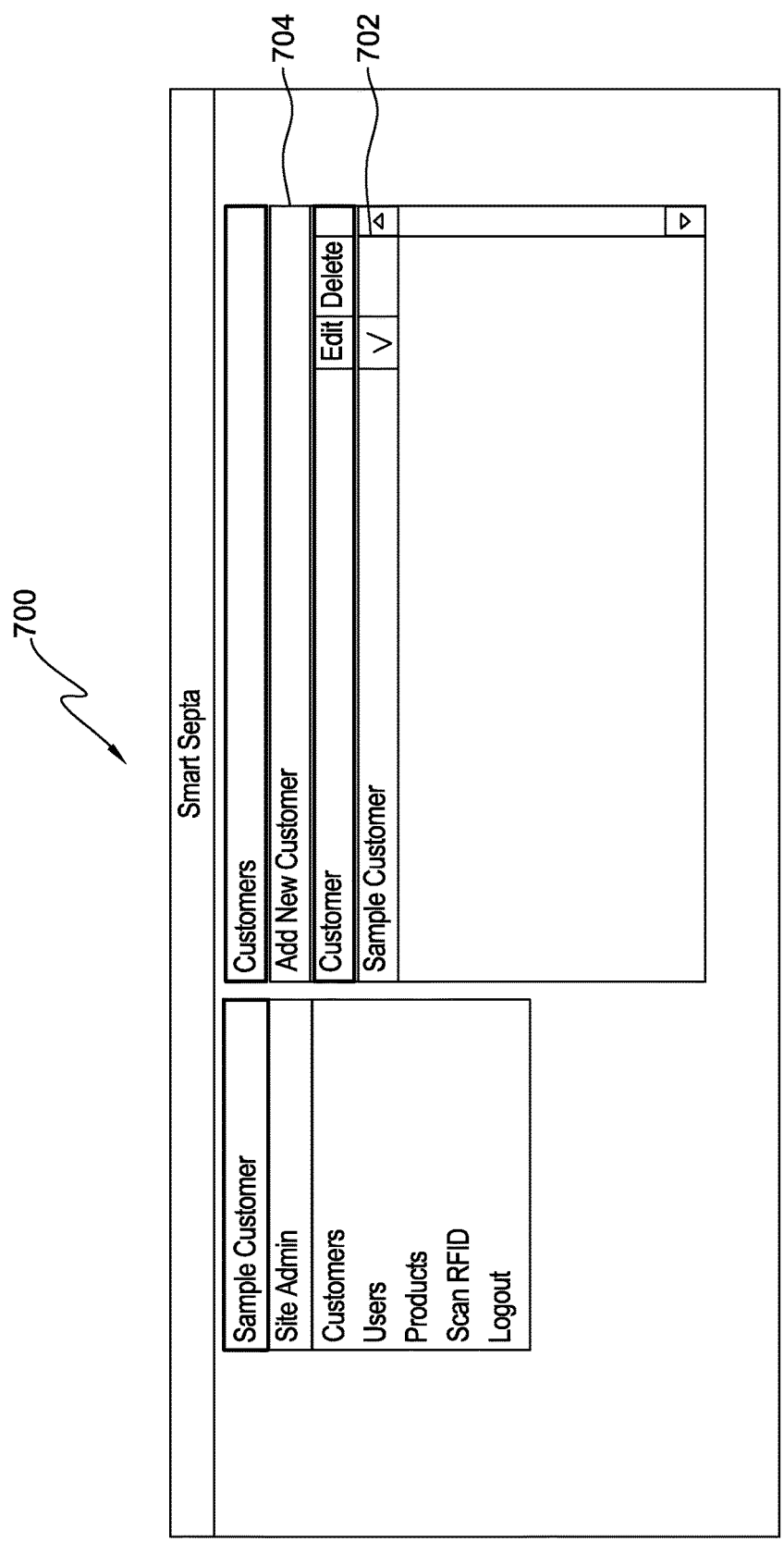
Figure 8:
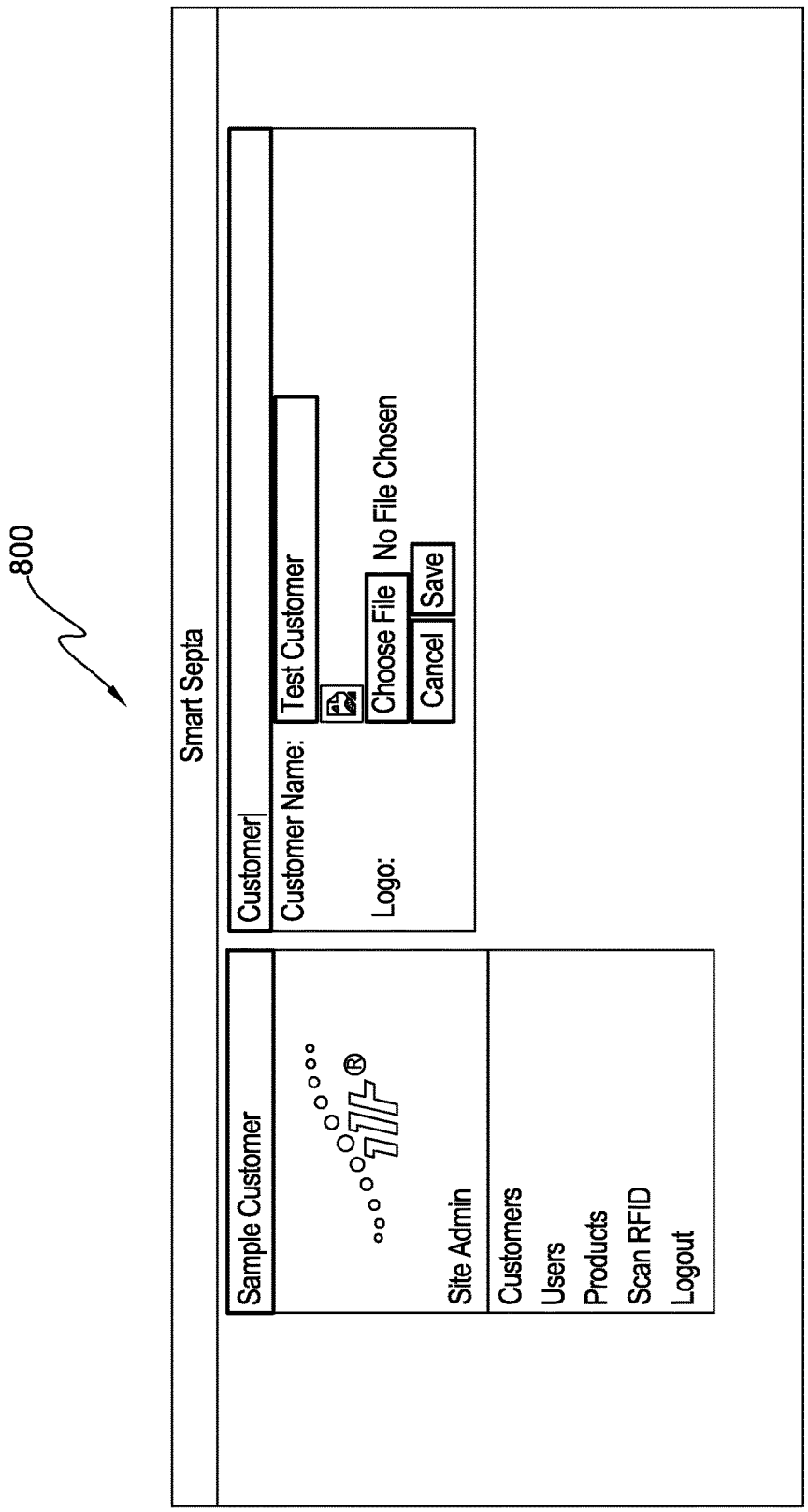

On an initial setup, the septa or liner manufacturer can configure its customer(s), for instance vendor(s) of a container or container top assembly. FIG. 7 depicts a customer view 700 depicting an existing customer account 702 and displaying the customer name ("Sample Customer") and an edit option to edit customer details. "Add New Customer" button 704 is provided to enable a user to configure a new customer account. Such configuration is depicted in FIG. 8, which interface may be the same interface presented when an existing customer's details are edited. Thus, FIG. 8 presents a customer details interface 800 in which a customer name is input and a logo to associate with the customer account is optionally selected. Once these details are saved, the customer account is established with those details and listed in the customer view (FIG. 7). It is understood that additional or different customer details than those presented here may be maintained for each customer.

Figure 9:
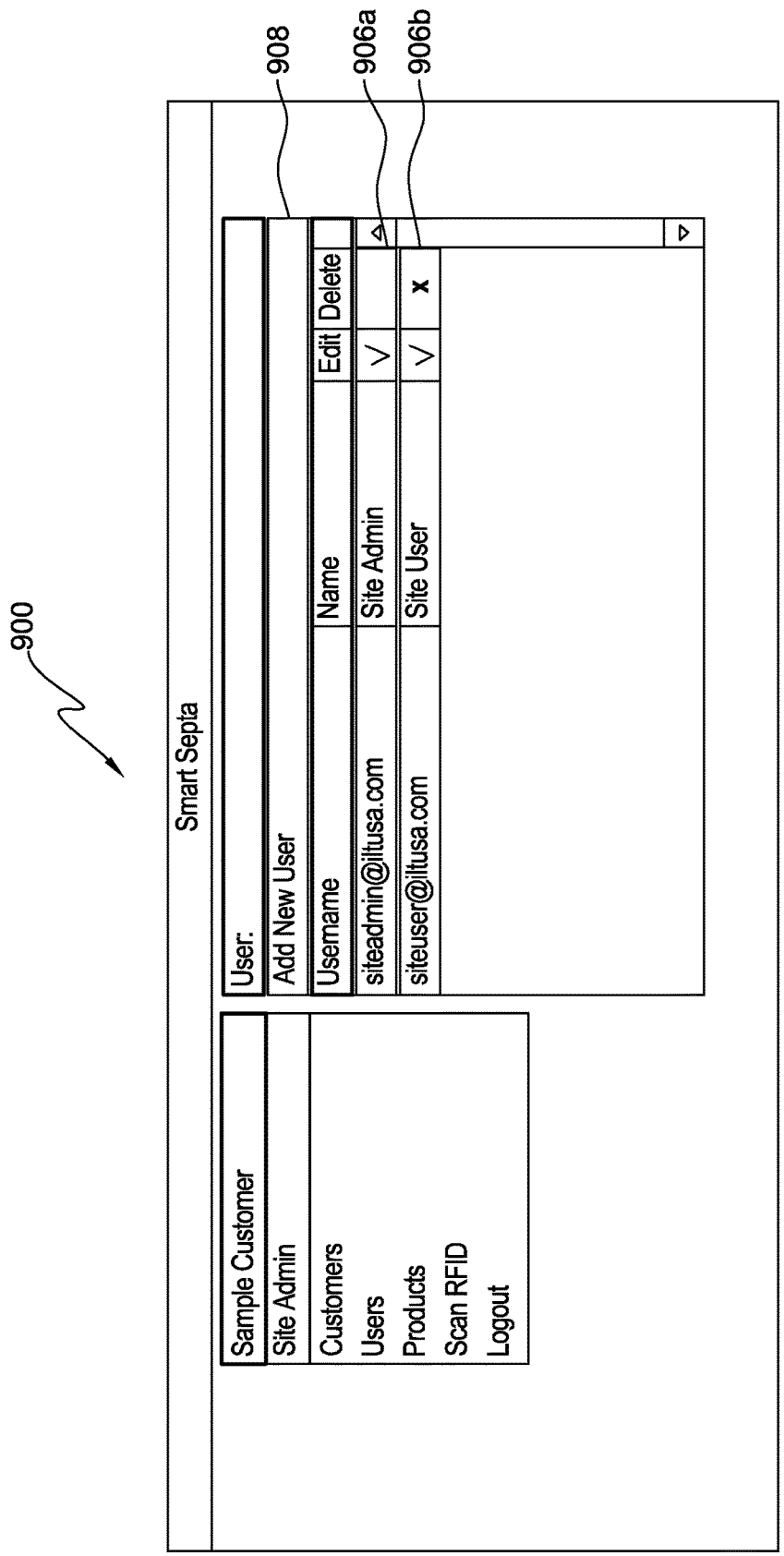
Figure 10:
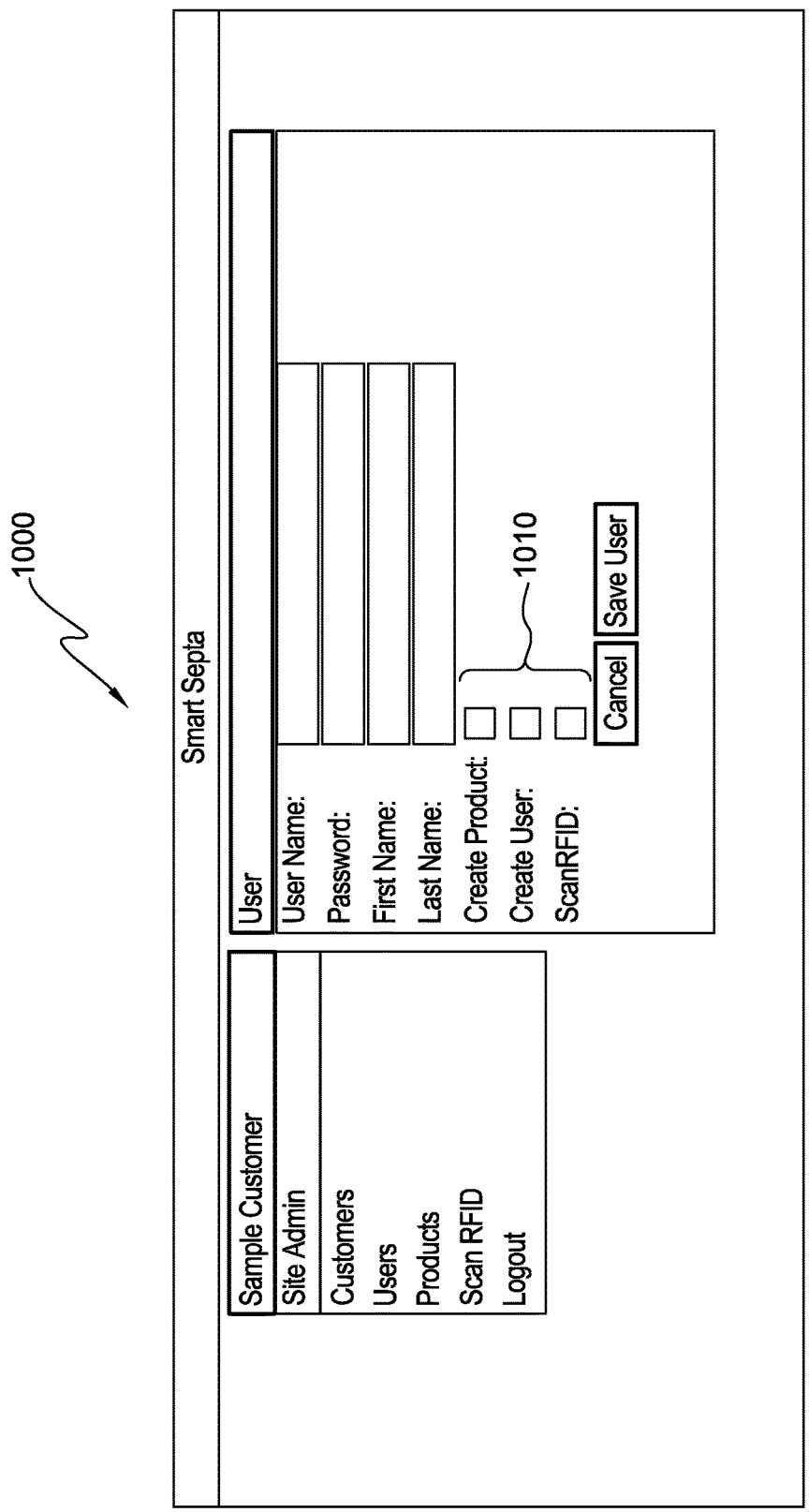

Users with various permissions can be added for each customer. FIG. 9 depicts a user accounts view 900 showing two user accounts 906a and 906b, each having their associated username and first/last names on the account (e.g. Site Admin, Site User), as well as an option to edit account details. "Add New User" button 908 is provided to configure a new user account for a given customer account, as depicted in FIG. 10. The interface of FIG. 10 may be the same interface presented when an existing user's account details are edited. FIG. 10 presents a user account details interface 1000 in which a user name, password, first name, and last name can be input. Individual permissions 1010 may be selected to enable the creation of products or other user accounts, or enable scanning ability and access to data via RFID for the user. The appropriate permission are checked by the admin setting up this user account. Once these details are saved, the user account is established with those details, and listed in the user accounts view (FIG. 9).

At some point, users may configure product templates corresponding to various product types. As an example, a user associated with a laboratory that purchases a container with a container top assembly as described herein may establish a product template for containers of that type. The product template defines the attributes to be monitored and tracked with respect to products of the product type to which that product template corresponds. The customizability afforded by this setup can be particularly advantageous because different end users may desire to track different data points/properties for a given product type. Enabling definition of the product templates, e.g. by end-users of the products, advantageously enables tracking of different attributes for a same product type. One end-user may wish to track, for instance, a fill volume and viscosity of fluid in a given container product offering from a vendor, while another end-user of that same container product offering may wish to track completely different attributes, such as date filled and location filled. In this manner, end-users are not forced into any particular type of product template configuration for a product in terms of the data being tracked—it is customizable to the individual end-users, and therefore can adapt to changes in customer needs.

Figure 11:
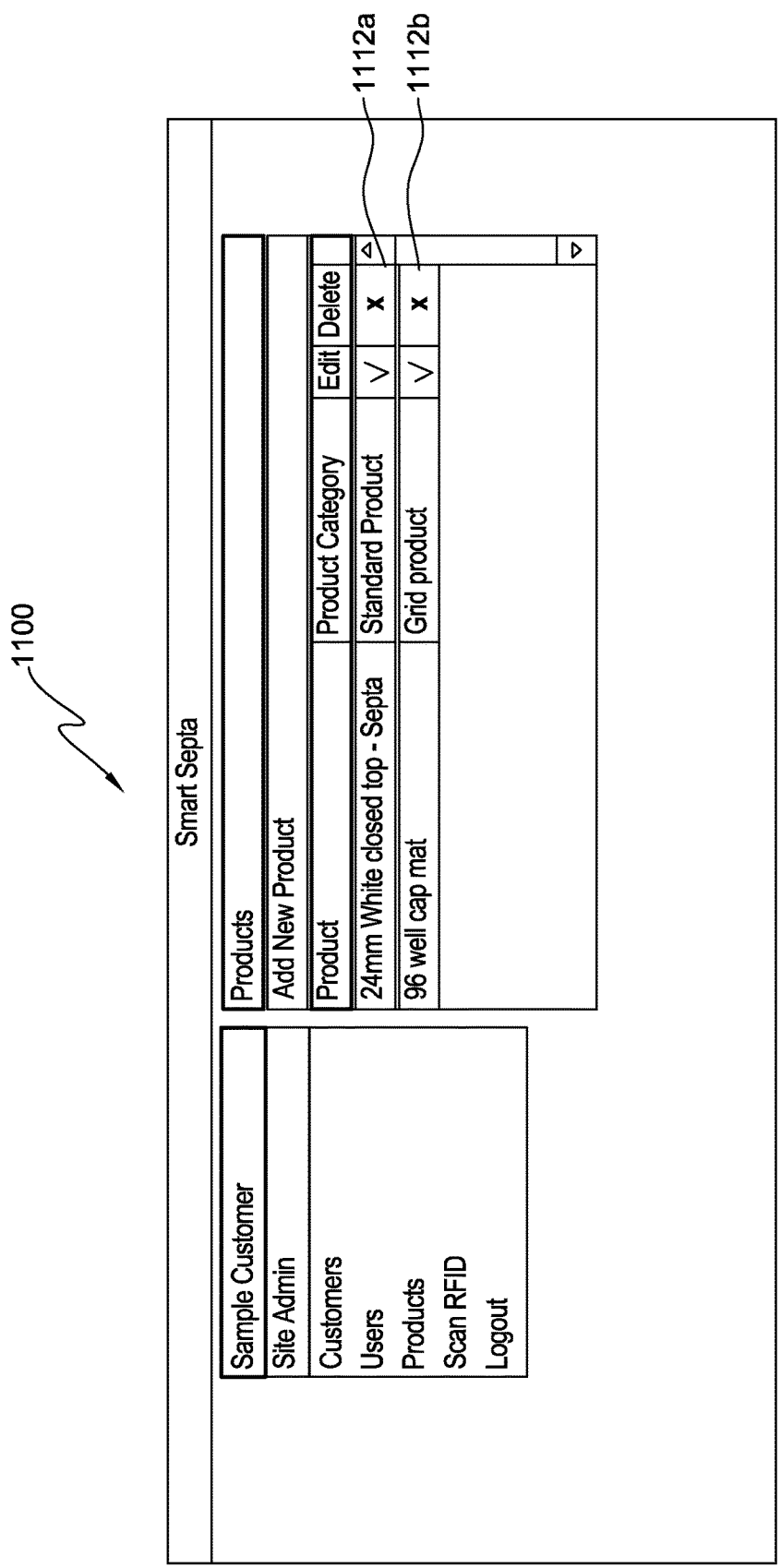
FIG. 11 depicts an example interface showing container top assembly product templates that have been configured in a product management and tracking portal and associated with a particular customer, in accordance with aspects described herein.

FIG. 11 depicts an example interface 1100 showing container top assembly product templates that have been configured in a product management and tracking portal and associated with a particular customer, in accordance with aspects described herein. A product template is used to instantiate the record(s) used to track a given product of the product type associated with the template. Product templates interface 1100 displays two product templates 1112a and 1112b. The product templates correspond to products categorized as either standard or grid products, which are two different product categories described herein. Product template 1112a corresponds to a product categorized as a "standard product". The standard product in this case is a 24 mm white closed top container top assembly having an included septum incorporated into a liner of the container top assembly, as described above. The product, "24 mm White closed top—Septa", therefore refers to the type of product to which this template pertains. Each individual product (i.e. each separate container top assembly) is therefore of a particular product type, in this case "24 mm White closed top—Septa", and that product type is categorized as a standard product. When each unique "24 mm white closed top—Septa" container top assembly product is registered with Smart Septa, as described below, the appropriate template for that product type (i.e. template 1112a) will be used to instantiate records for keeping data for data points defined by that template.

The product category in this case of template 1112a is "standard", but other product types within the "standard product" category are possible. For instance, a vendor may offer a 30 mm black closed top container top assembly having an included septum incorporated into a liner of the container top assembly. In that case, the category of that product ("standard") is the same as above, but the product type is different because it is a different type of product. Thus, each product category may include multiple different product types, each having an associated template defining data points to collect for that type of product.

Product template 1112b corresponds to a product type "96 well cap mat" categorized as a "grid product", described in further detail below.

FIG. 12-17 depict example interfaces for configuring product templates and defining data points associated with those product templates in a product management and tracking portal, in accordance with aspects described herein. Smart Septa enables, in these examples, two base categories of products (Standard and Grid products). These product categories have their own unique features within the system and they each have particular attributes, or data points, for which data is to be collected.

Figure 12:
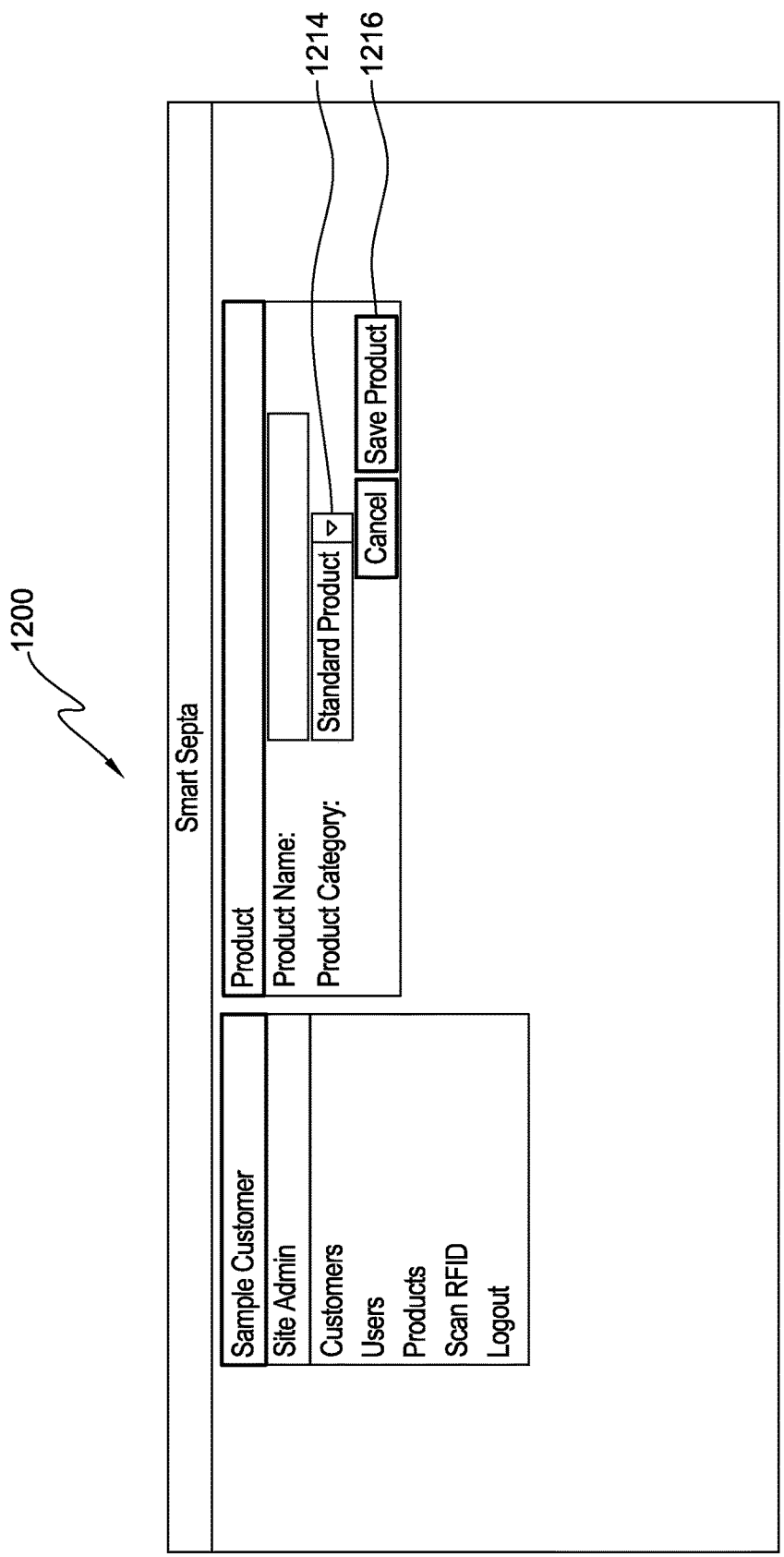
FIGS. 12-17 depict example interfaces for configuring product templates and defining data points associated with those product templates in a product management and tracking portal, in accordance with aspects described herein.
Figure 13:
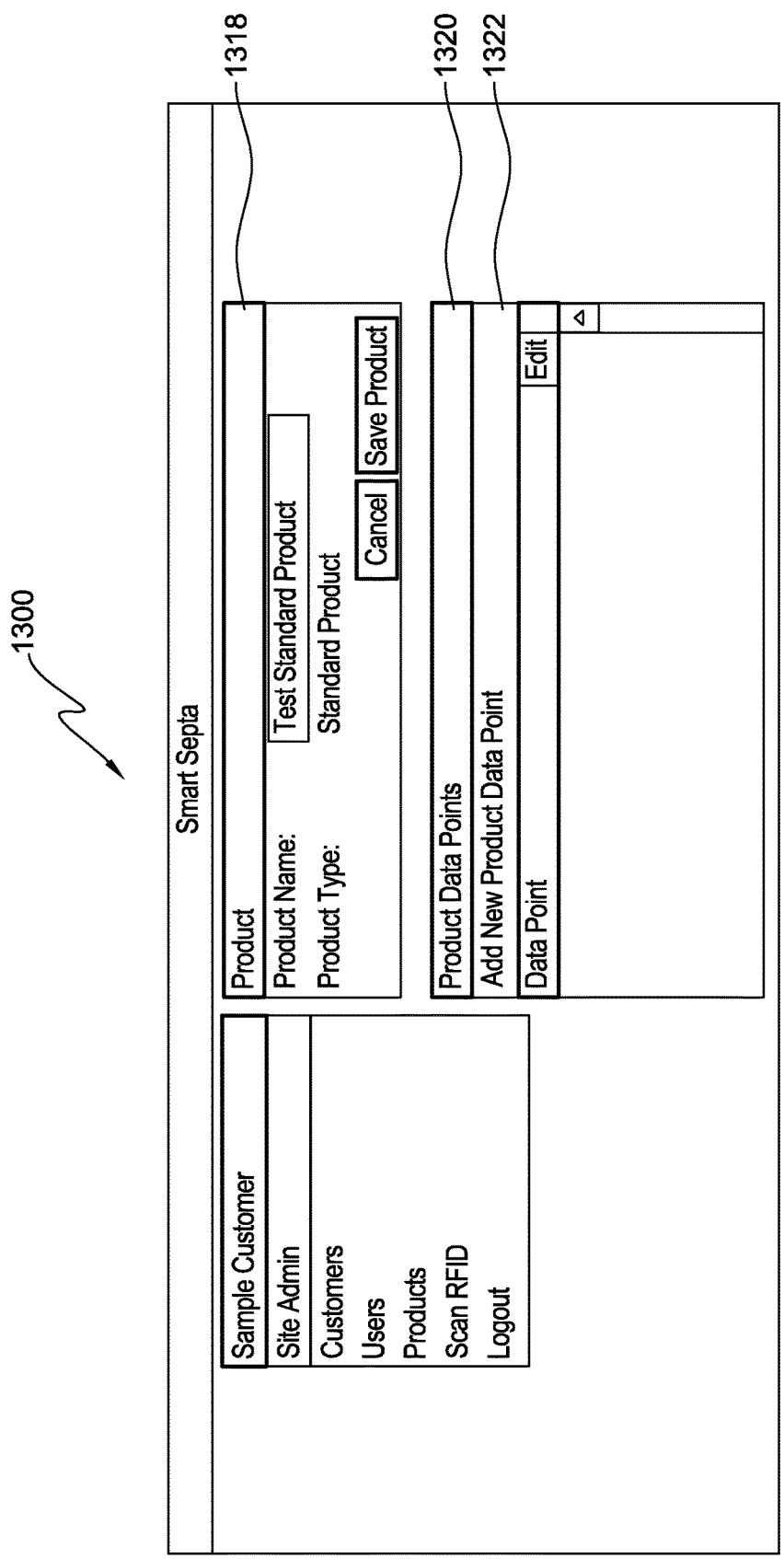
Figure 14:
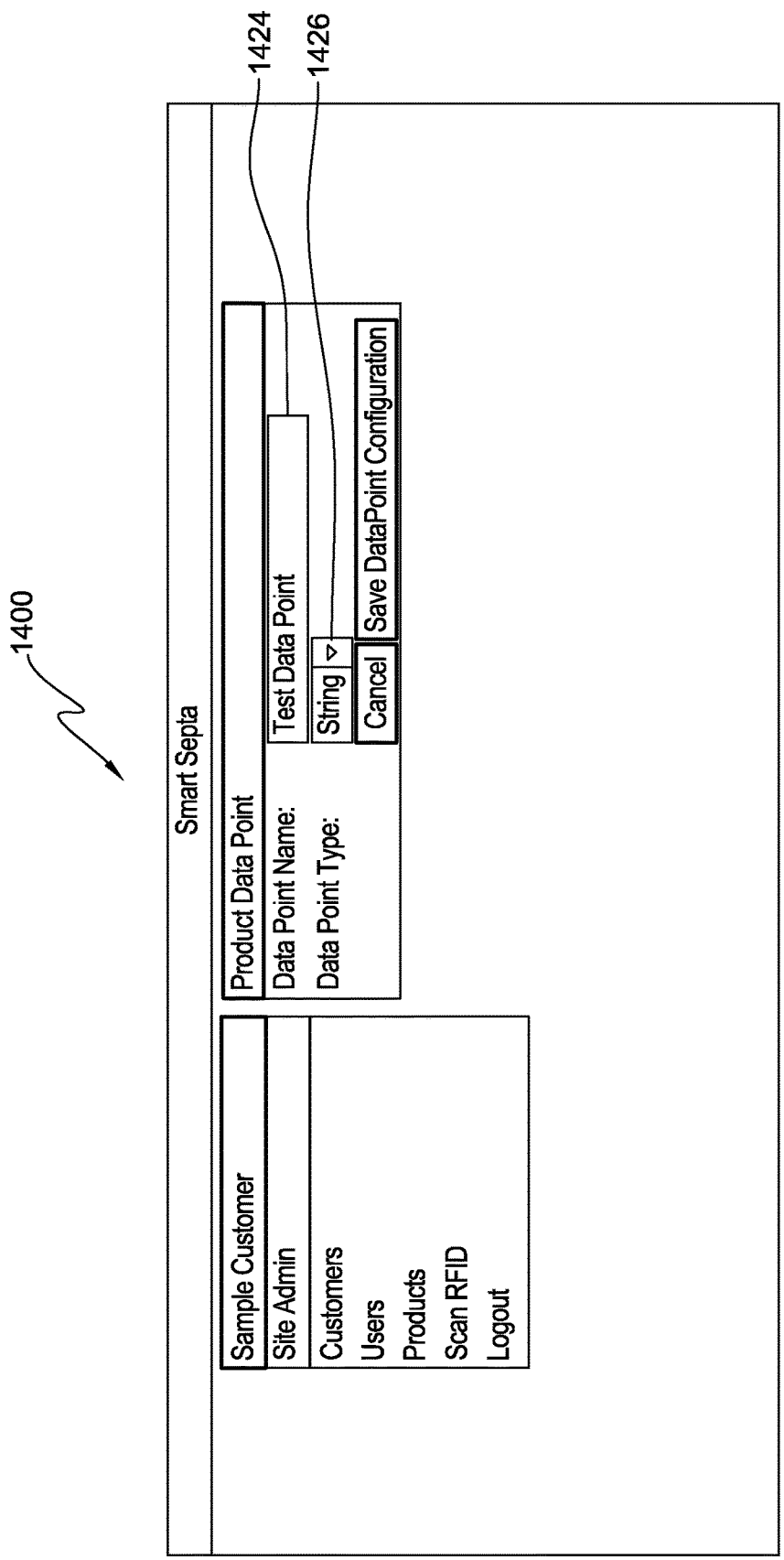

FIG. 12 depicts an example interface 1200 to add a new product to Smart Septa—that is to initiate the creation of a product template for a particular product type. The user setting up the product template enters a Product Name (such as "24 mm White closed top—Septa") and selects a product category using the category selection box 1214. In this case, the user selects the Standard Product category. The product category selection will dictate the type and configuration of the attributes that may be defined for the product type. When the user clicks the Save Product button 1216, a product template configuration interface is presented, as depicted in FIG. 13. The interface 1300 includes product information portion 1318, enabling the user to change/update the Product Name, and product data points definition portion 1320. The user adds a new data point for which data about products of that product type are to be maintained by clicking the "Add New Product Data Point" button 1322, which takes the user to a product data point definition interface. An example such interface is depicted FIG. 14. The interface 1400 includes a Data Point Name entry box 1424 and a Data Point Type selection box 1426. For each standard product data point being defined by a user, the user inputs a name for the data point and indicates the type of data point being defined. In the example of FIG. 14, the type of data point is String, indicating that that data point is to be a string of characters that is to be associated with the product for the template being configured. For instance, the data that will be maintained for this data point when a product of this type is setup may be a string of characters indicating the name of the material to be contained in the container that this product will seal.

Many other data point types are possible. Example other data point types can include, by way of example and not limitation, Boolean value, numerical value (integer, decimal), date or date range, or selection among a defined list of items.

By way of specific example, assume a user has purchased sample vials having a standard product screw top with a septum in the cap, and the user defines the following data points in the corresponding template for that product:
- Data Point 1: Data Point Name="Contents"; Data Point Type=String
- Data Point 2: Data Point Name="Date Filled"; Data Point Type=DateValue
- Data Point 3: Data Point Name="Patient ID#"; Data Point Type=Integer
- Data Point 4: Data Point Name="Extraction Count"; Data Point Type=Integer In this example, the user has defined four data points for this product type. When the user registers (described below) a unique product of this product type by scanning the RFID tag embedded in the product as described herein, the template will be used to establish record(s) for that unique product. The record(s) will hold data for each of those data points. Thus, the user may obtain a sample (for instance blood from a patient) to be contained by the vial, scan the RFID tag of the cap to register the product with Smart Septa, then enter data for the four data points. For instance, the user provides the string "Blood Sample" for the "Contents" data point, provides the current date for the "Date Filled" data point, and provides the patient's Patient ID for the "Patient ID#" data point. Since this product includes a septum, extraction of some or all of the sample through the septum is possible. The "Extraction Count" data point refers to the number of extractions through the septum that have been made. When the product is first placed in use, there have been zero extractions. Over time, as extractions of the blood sample are made, the extraction count may be incremented by a user logging in, scanning the RFID tag of the vial cap, and updating the extraction count for each extraction.

Figure 15:
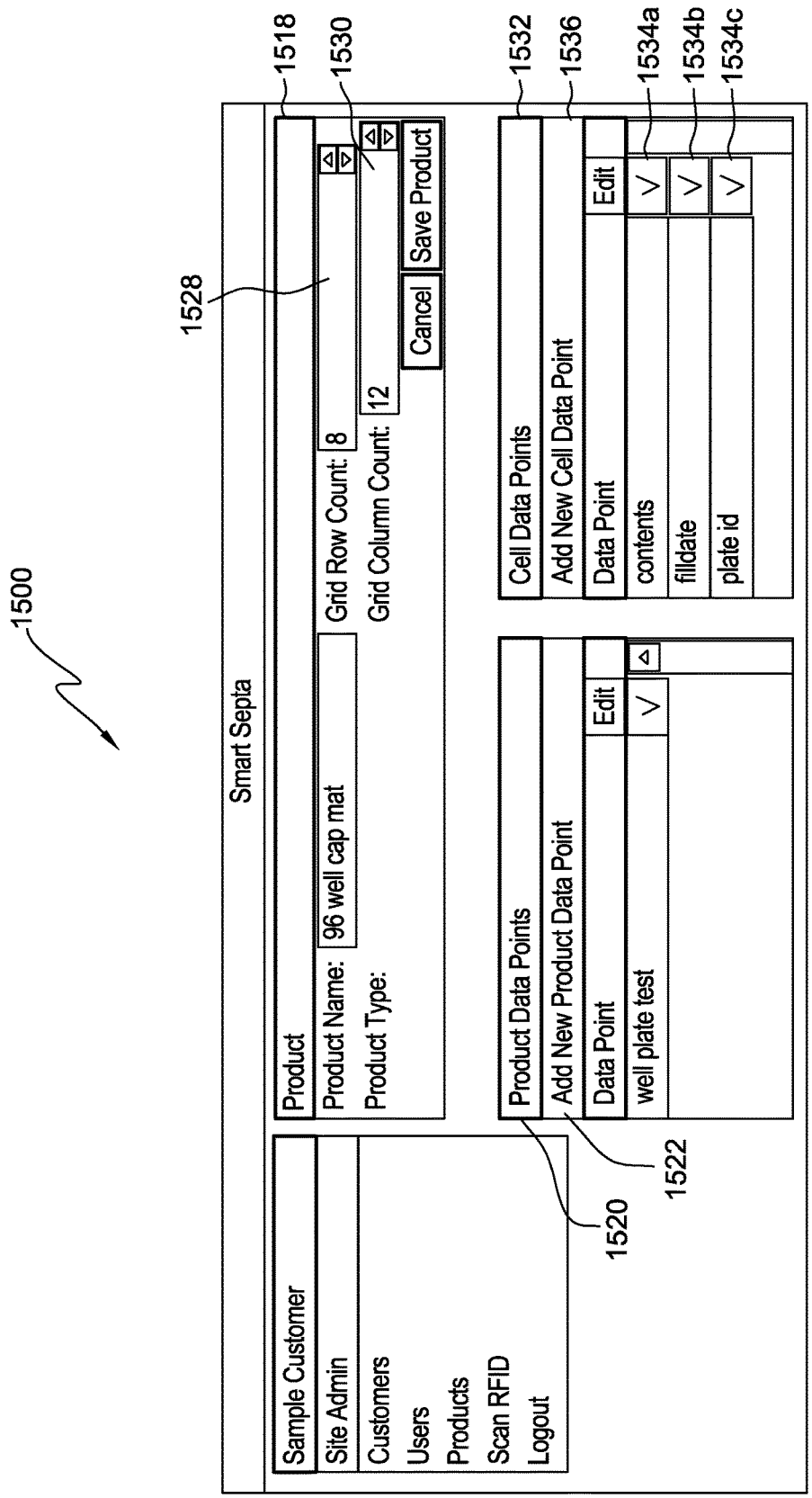
Figure 16:
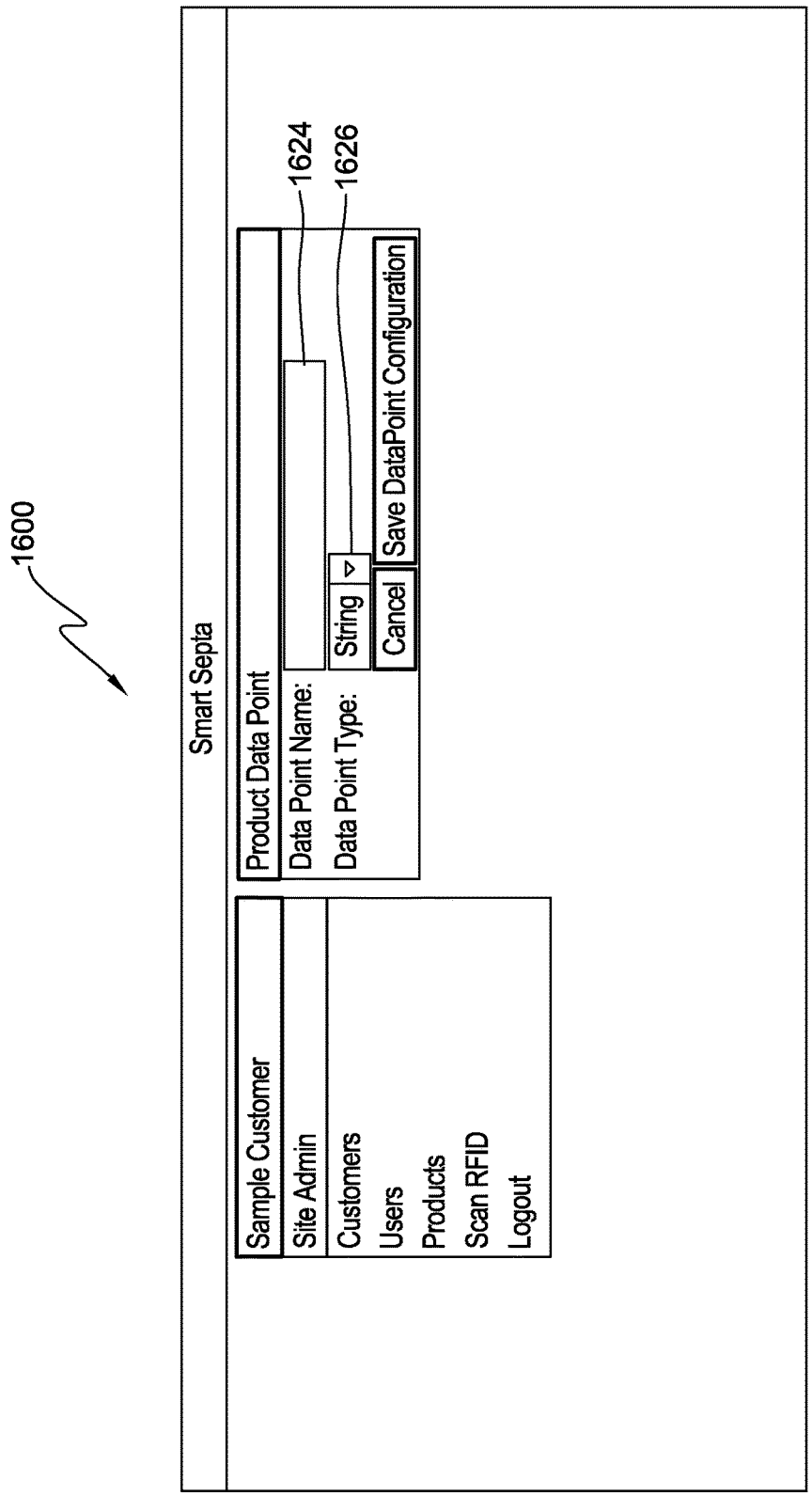

Referring again to FIG. 12, another possible product category as described herein is a grid product. An example grid product is a cap mat (e.g. FIG. 3A) for a well plate, in which the individual wells are also referred to as cells. If the user changes selector 1214 to create a template for a grid product, a product template configuration interface as depicted in FIG. 15 is presented to the user to enable configuration of a grid product template. Interface 1500 includes a product information portion 1518 where the user can change/update the Product Name, as before. Since this is a grid product, the user can also define the grid's row count 1528 and column count 1530.

Interface 1500 also includes a product data points definition portion 1520 and cell data points definition portion 1532. The product data points definition portion 1520 includes product data points—ones that are correlated and applicable to the entire product. Example product data points that may be used for a cap mat grid product include characteristics or properties of the cap mat itself (a numerical value of the number of cells, the size of the cap mat, material the cap mat is made of, physical location of the cap mat, etc.) or properties that apply to all of the cells (such as if the same type of material will be placed in each cell, volume of each cell, etc), as examples. "Add New Product Data Point" button 1522 is used to define further product data points, using a product data point definition interface 1600 of FIG. 16, the features and function of which is substantially similar to the interface described above with reference to FIG. 14. For instance, it includes a Data Point Name entry box 1624 and a Data Point Type selection box 1626, as before.

Figure 17:
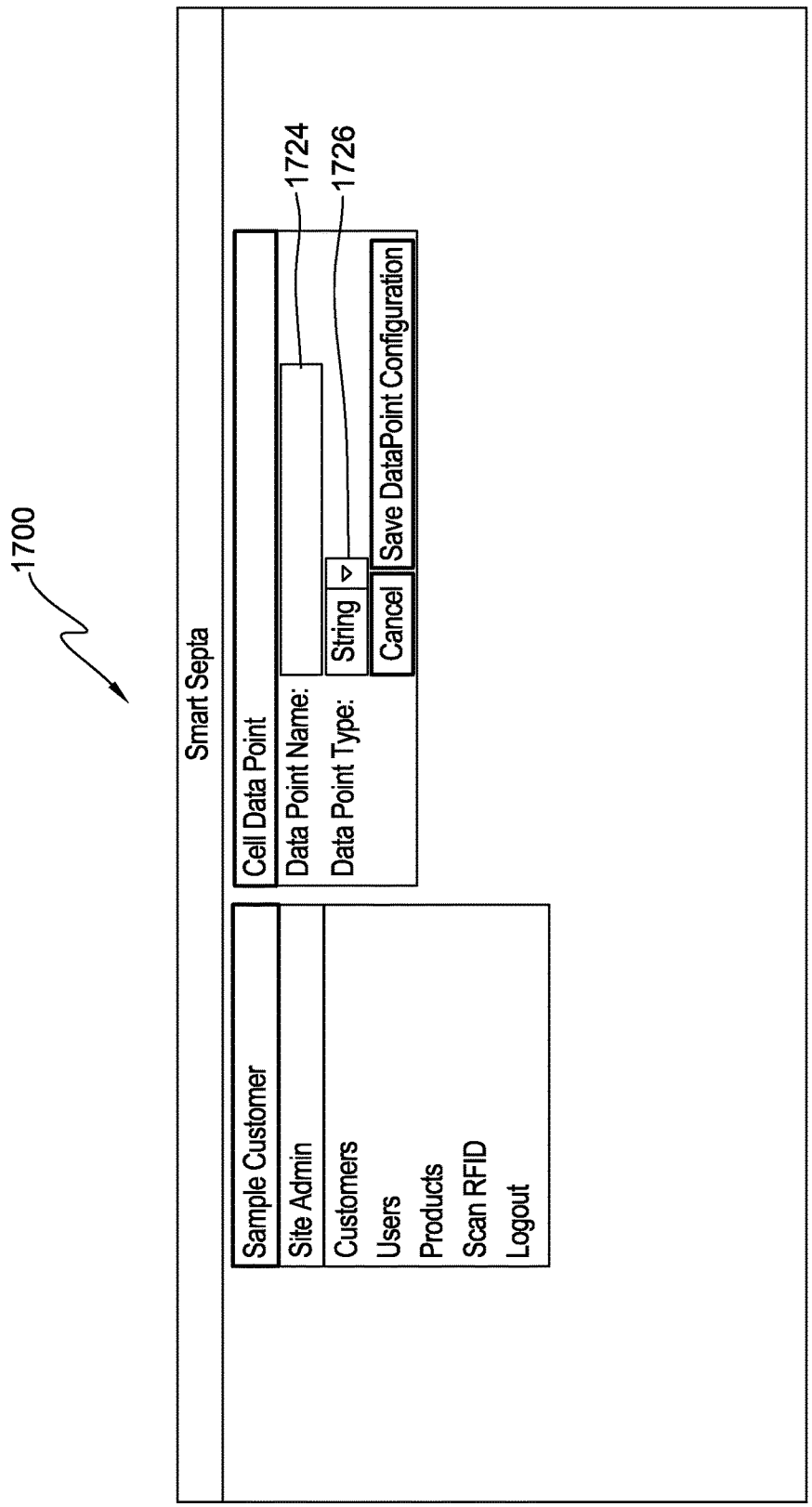

Referring back to FIG. 15, cell data points definition portion 1532 includes cell data points—ones that correlate to each individual cell of the grid product. The cell data points portion 1532 therefore serves as a template of the data points to be maintained for each of the cells of the well plate. The data points defined for each cell will be the same, but the individual values for those data points may vary across the cells. In FIG. 15, cell data points include "contents" 1534a (to indicate contents of an individual cell), "filldate 1534b" (to indicate data on which the cell was filled), and "plate id" 1534c. The plate id may be a dynamic data point/property of the well plate, and may be defined by the customer. If may identify the well plate of which the cell is a part. "Add New Cell Data Point" button 1536 is used to define further cell data points. Cell data points are defined similar to the way product data points are defined. Referring to FIG. 17, interface 1700 for defining a cell data point is presented, in which the user provides a Data Point Name in entry box 1724 and a Data Point Type using selection box 1726.

In this manner, users can define product data points as well as the individual cell data points for the grid, and dynamic configuration of parameters and collection points is provided for each of the different customers that use the system.

Sometime after configuration of a product template defining the data points for a product type, consumers of the product can place an instance of product (e.g. a particular container top assembly, cap mat, etc.) into use and register that instance with Smart Septa through the front-end. This is done, in part, using an interface for entering tag data into the portal, an example of which is depicted in FIG. 18.

Figure 18:
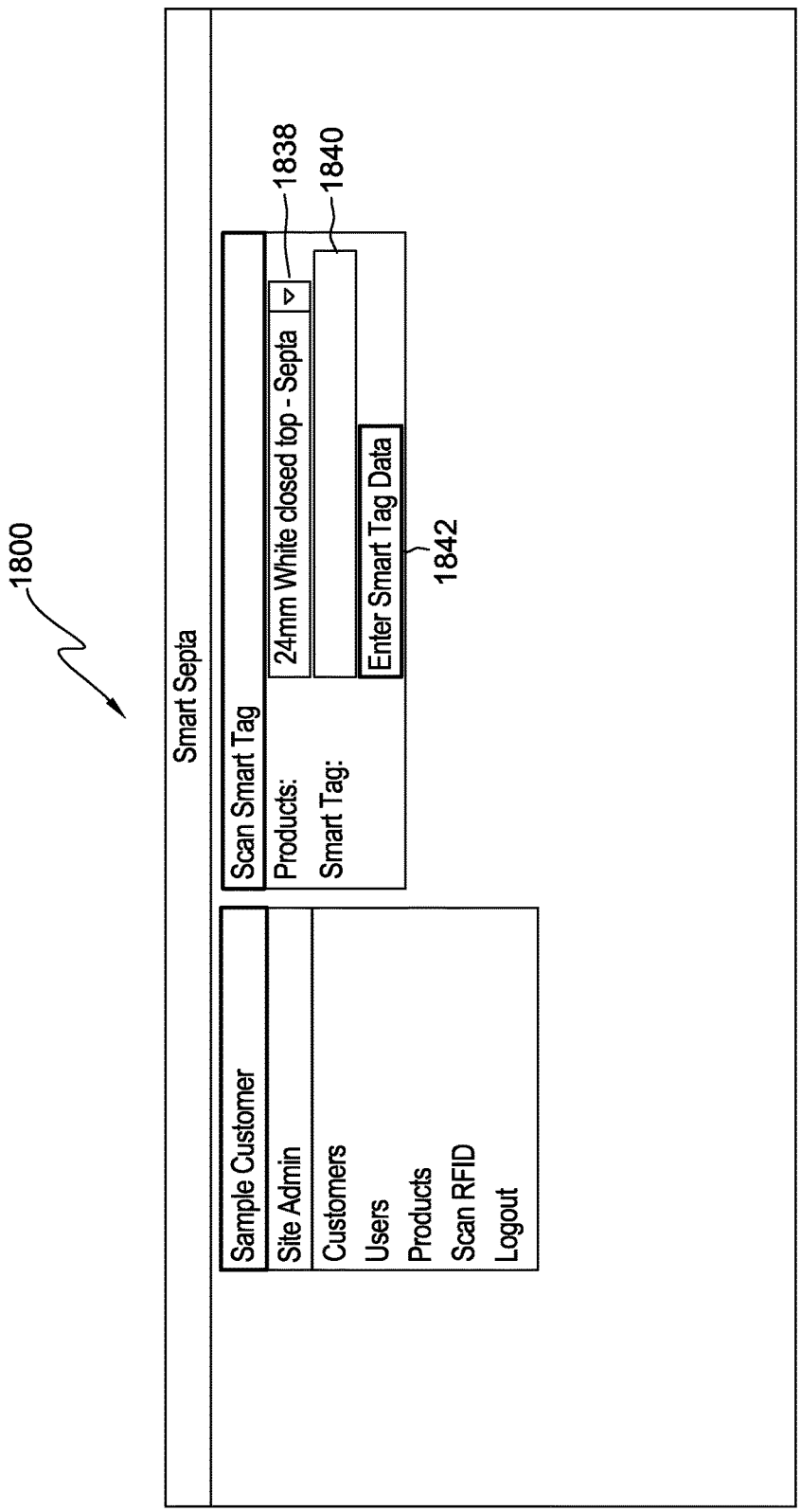
FIG. 18 depicts an example interface for entering tag data into a product management and tracking portal, in accordance with aspects described herein.

Interface 1800 of FIG. 18 presents a product selection box 1838 and smart tag identifier input field 1840. At the front-end, using this interface, the user selects a product type from the list of configured product types (FIG. 11) using the product selection box 1838. In this example, the user has selected the standard product "24 mm White closed top— Septa" product. This effectively selects the product template that is to be used in connection with the individual product uniquely identified by the smart tag that the user then provides. The user provides the smart tag identifier in input field 1840. This may be done by, for instance, scanning the RFID tag embedded with the product using an RFID reader device. The device and/or a system in communication therewith may automatically populate the smart tag identifier input field 1840 with the identifier. After the product is selected and smart tag is entered, the user can select the Enter Smart Tag Data button 1842 to initiate searching for the tag data in the database. If the user enters smart tag data of a product already registered with the database, then in some embodiments the user may ignore the product selection box and just enter the smart tag data, since the system will already know the product type associated with that tag.

Regardless of whether or not the smart tag identifier is found in the database (i.e. the product has already been registered with Smart Septa, or this is the first time Smart Septa has received this Smart Tag), an interface for viewing or entering data about the product for the data points defined by the product template corresponding to that product is presented. An example such interface for a standard product (as opposed to a grid product) is depicted in FIG. 19.

Figure 19:
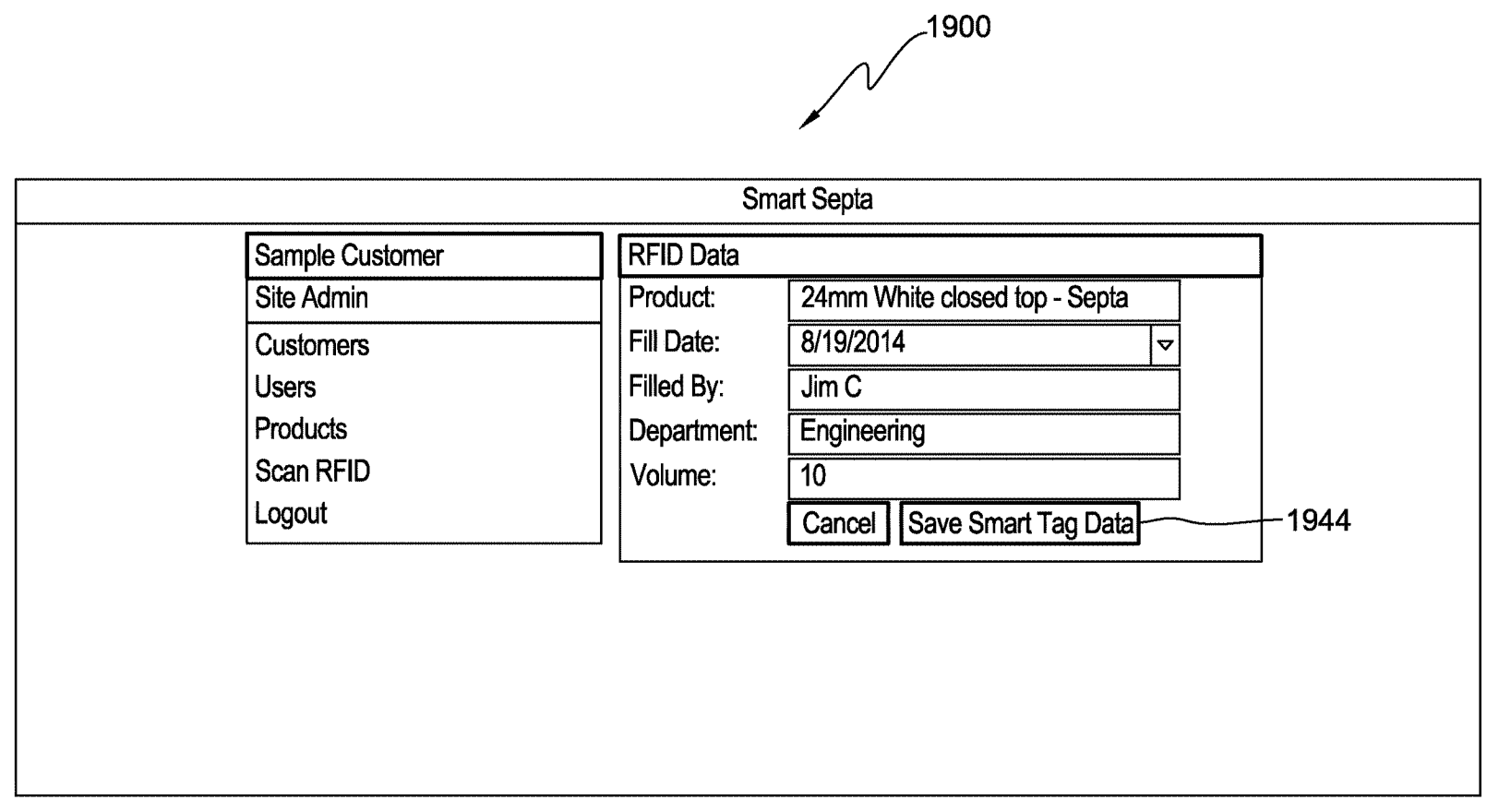

In the example of FIG. 19, the interface 1900 contains data for the data points "Fill Date", "Filled By", "Department", and "Volume". When the product is first registered, data would be lacking for each of these data points. Alternatively, some or all of the data points may be initially populated with default data, if desired, subject to later modification/updating. After the user enters data for these data points and selects the "Save Smart Tag Data" button 1944, the data is committed to the record(s) for this product in the database. Then, when the user subsequently enters the smart tag (FIG. 18) to view product data, interface 1900 is presented with the current data for each data point. The user can, if desired, make and save changes to data for each data point data using interface 1900. In further embodiments, the system may maintain a historical record of data for each of these data points over time. This record may be presented in interface 1900, or otherwise accessible through this interface or another interface described herein.

Figure 20:
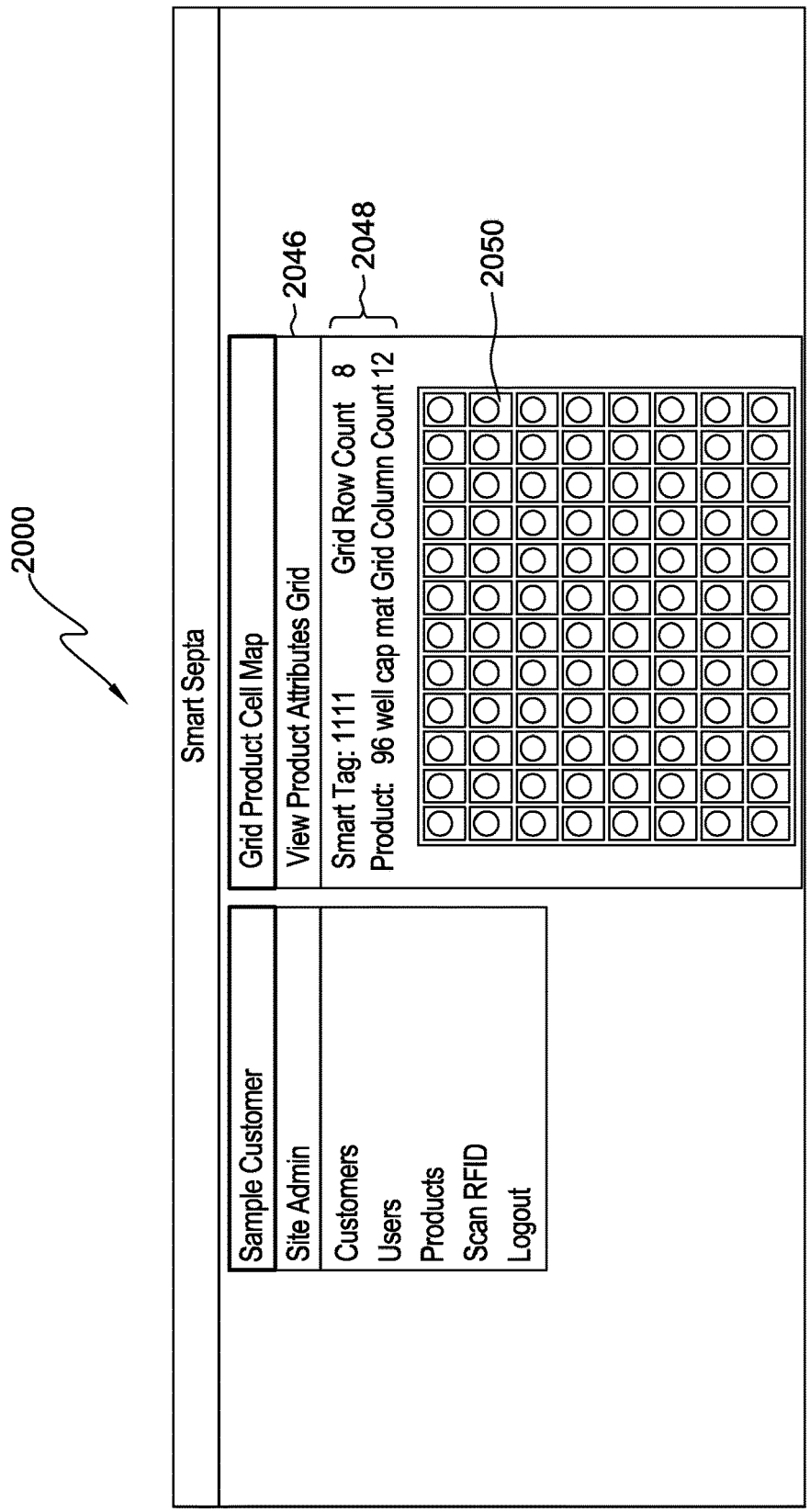

Interface 1800 may be used to input smart tag data for a grid product as well, based on the product selected in product selection box 1838 being a grid product. FIGS. 20-21 depict example interfaces to view or enter data about a grid product for data points defined by a product template corresponding to a grid product, in accordance with aspects described herein. Referring to FIG. 20, initially, a grid product cell map interface 2000 is presented that displays a product attributes grid 2046. The product attributes grid includes product attributes portion 2048 showing product data points. In this case, the smart tag identifier ("1111"), product type ("96 well cap mat"), grid row count ("8") and grid column count ("12") are displayed, which are product attributes maintained for this product of the type "24 mm White closed top—Septa".

The product attributes grid 2046 also includes a clickable depiction of the cell grid. Each representation of a cell (e.g. element 2050) in the cell grid is selectable/clickable. Clicking a representation of a cell in the grid will present an interface to view cell data points. An example such interface is depicted in FIG. 21. Interface 2100 indicates the data associated with the particular cell. In this case, it identifies the product type of which the cell is a part (96 well cap mat) and the location of the cell in the grid of that product (row 1, column 1), which may be data points automatically added and populated based on the positioning of the cell in the grid and the type of product of which this cell is a part. Also indicated is data for the "contents", "filldate", and "plate id" data points (if known). In the example of FIG. 21, data for these latter three data points have not yet been provided. This may be the case when, for instance, the user has recently filled the cell and is now using interface 2100 to enter the data for these data points.

Referring back to FIG. 20, visual features may be provided in the depiction of the cell grid. For instance, color coding may be used to indicate cells for which data for data points has, or has not been, provided. By way of specific example, cells for which no data for contents, filldate, and/or plate id have been provided may be colored green (indicating the well is empty), while cells for which data for the contents, filldate, and/or plate id have been provided may be colored red. This provides a visual indication of empty vs. filled cells. Additionally or alternatively, any criteria, such as the data values for the data points, may be used to highlight certain cells in the cell grid. In one particular example, cells with a fill date prior to a defined date may be colored red, while cells filled after that date may be colored green.

Figure 22:
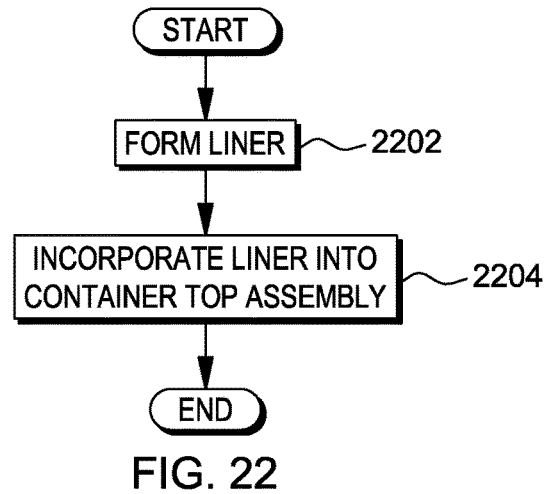
FIG. 22 depicts an example process for fabricating a container top assembly for sealing a container, in accordance with aspects described herein.

Products described herein may incorporate a fully protected RFID tag, for instance one embedded within a liner, such as a septal liner, in which the RFID tag becomes associated with data and data points/properties that are trainable and trackable via systems described herein. Accordingly, FIG. 22 depicts an example process for fabricating a container top assembly for sealing a container, in accordance with aspects described herein. The method begins by forming a liner to be incorporated into a container top assembly (2202). Next, the liner is incorporated into the container top assembly (2204) such that the liner is configured to seal a container based on operatively coupling the container top assembly to the container. The container top assembly may have at least partially embedded therein an RFID tag. For instance, formation of the liner may include embedding the RFID tag into a septum, and incorporating the septum into the liner.

In some examples, the container top assembly includes a well plate cover configured to cover and seal a multi-well plate. Incorporating the liner into the container top assembly in such a case may involve embedding the RFID tag in the well plate cover of the container top assembly. In other examples, the container top assembly includes a circular container cap, where the RFID tag is embedded into the liner, and where incorporating the liner into the container top assembly includes lining the circular container cap with the liner. A liner, for instance, may include a septum, where the RFID tag is embedded within the septum.

Figure 23:
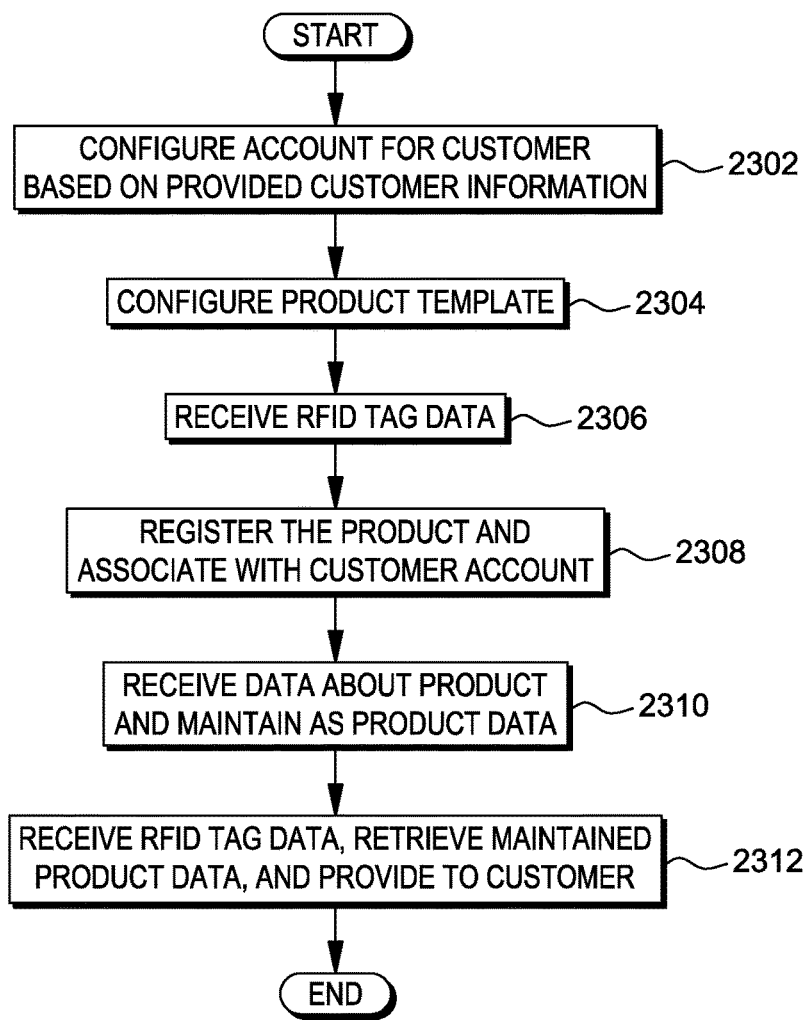
FIG. 23 depicts an example process for providing product management and tracking capabilities, in accordance with aspects described herein.

Additional aspects described herein enable dynamic specification of data associated with a product, for instance contents of an enclosure, which data may change over time. Additionally, different entities may define the particular product attributes for which data are to be maintained for that entity. Accordingly, FIG. 23 depicts an example process for providing product management and tracking capabilities, in accordance with aspects described herein. In some examples, the process of FIG. 23 is performed by a computer system, such as a Smart Septa system as described herein.

The method begins by configuring (for instance on a computer system) an account for a customer based on provided customer information (2302). This may be performed based on receiving input from a vendor to configure the account, for instance.

A product template configuration may then be performed (2304). Configuring the product template includes defining data points for which data about a product of that product type are to be maintained, and may be based on receiving input from the customer (e.g. via a user account thereof) to specify the data points for the product template. In this manner, a user associated with the customer (an employee of the customer, for instance) may then configure the product template for a type of product. These data points are thereby defined according to customer/user specification.

Next, RFID tag data is received (2306). The RFID tag data is of an RFID tag that is, for instance, embedded within a product the product type for which the template was defined. Then, the product may be registered within a database and associated with the account for the customer (2308). This registering and associating may be based on receiving the RFID tag data, e.g. when a user scans the RFID tag to register the product. The RFID tag data uniquely identifies the product in the database, and the registering configures the database to maintain data about the product for those data points defined by the product template.

At some point—perhaps as part of the product registration or at some later time—the method continues by receiving data about the product from the customer (or user associated therewith), and maintaining, in the database, the received data as product data for the product (2310). The data may include data about the product for at least some of the data points that were defined in the product template for that type of product.

Subsequent to this, the method includes receiving the RFID tag data, retrieving some or all of the maintained product data for that product, and providing that data to the customer (2312). This retrieval and provision of maintained product data may be performed based on the customer (e.g. user) scanning the RFID tag embedded within the product. The user may perform this as part of a product data access or update procedure based on using the product in accordance with the user's particular application. For instance, the user may be a lab technician using the product in connection with lab samples with which the user works. The data retrieval may be made by the technician to access and/or change data associated with the particular product.

As described above, the product may include a container top assembly for sealing a container. The maintained product data may include, for instance, data indicating the contents of the container. Alternatively, the product may include a well plate cover for use with a well plate, and the maintained product data may include one or more of: a grid size of the well plate, a number of wells of the well plate, or properties of each well of the well plate.

As part of the provision of maintained product data to the customer, a graphical user interface may be presented that displays a representation of each well of the well plate. Based on the customer (e.g. user) selecting a representation of a well of the well plate, properties of that well may be presented to the customer.

The receipt of data about the product from the customer and the maintaining of the received data may be repeated over time to build a history of use of the particular product. Retrieval and provision of the maintained product data can optionally retrieve and provide the history of use of the product to the customer.

FIGS. 24A-24F depict examples of a cap with which a container top assembly may be made according to aspects described herein. In some examples, a cap of FIGS. 24A-24F is fitted with a liner (not shown in FIGS. 24A-24F) as described herein comprising an RFID tag to form a container top assembly.

Figure 24A:
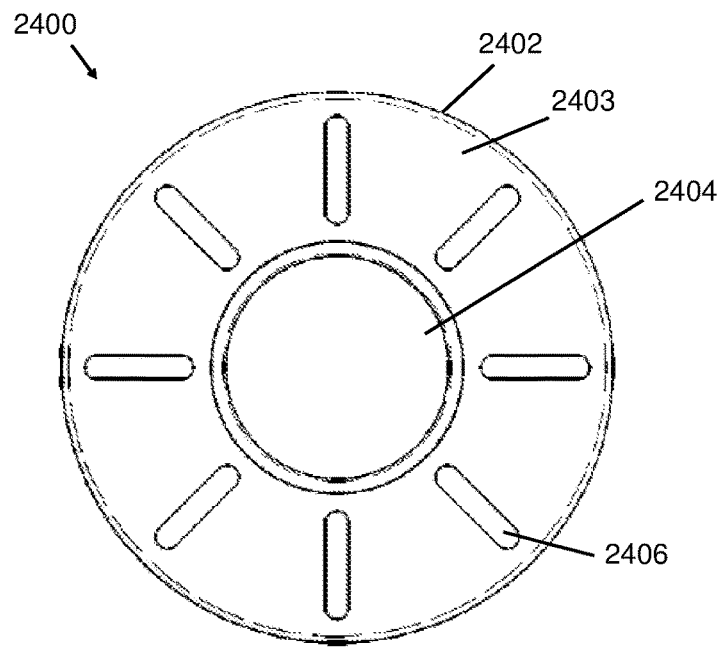
FIGS. 24A-24F depict examples of a cap with which a container top assembly may be made according to aspects described herein.
Figure 24B:
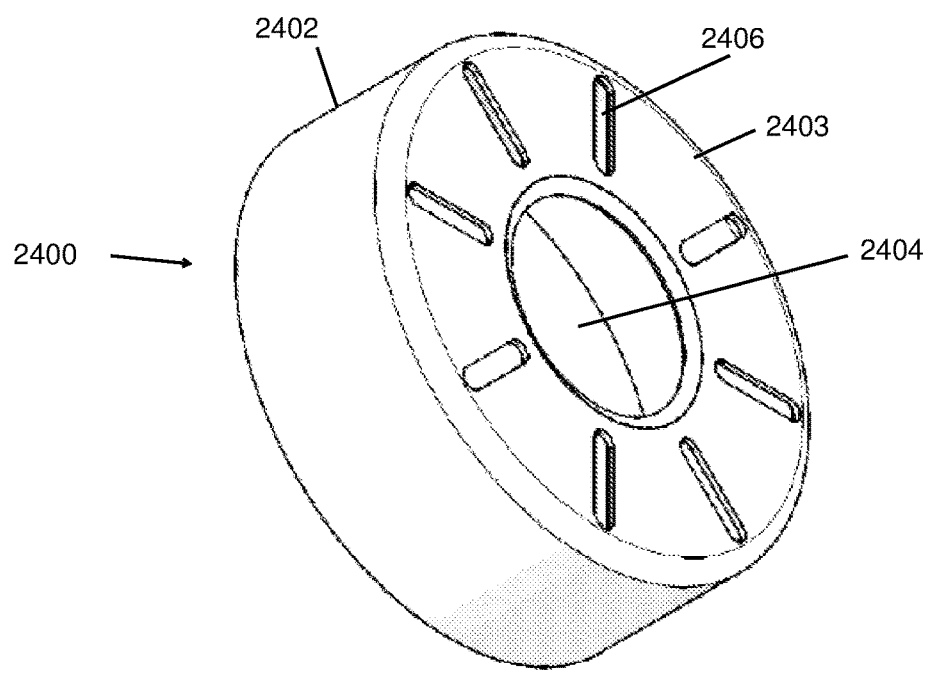

Referring initially to FIGS. 24A and 24B, FIG. 24A shows an overhead view of cap 2400 and FIG. 24B shows an isometric view of cap 2400. Cap 2400 is made of a body 2402 having a central opening/hole 2404 that enables access to contents of a container on which cap 2400 is screwed, crimped, or otherwise affixed. As an example, the opening 2404 enables a needle to pierce a liner affixed to the underside of the cap and extending across opening 2404. Cap 2400 also includes elongated openings 2406 in a top surface 2403 of the cap body, the elongated portions oriented radially in this example around opening 2404. The elongated openings provide access to portions of a liner affixed to the underside of cap 2400, i.e. under face 2403. In some embodiments, the RFID tag may be ring shaped at least partially encircling opening 2404 in a liner affixed on the underside of face 2403. The elongated openings 2406 enable interrogation of the RFID tag through top surface 2400 of the cap 2400. The cap 2400 can therefore be made of virtual any material (e.g. metal, plastic, or other material), even material that is impenetrable to RF waves, because elongated openings provide access to the underlying RFID tag.

Figure 24C:
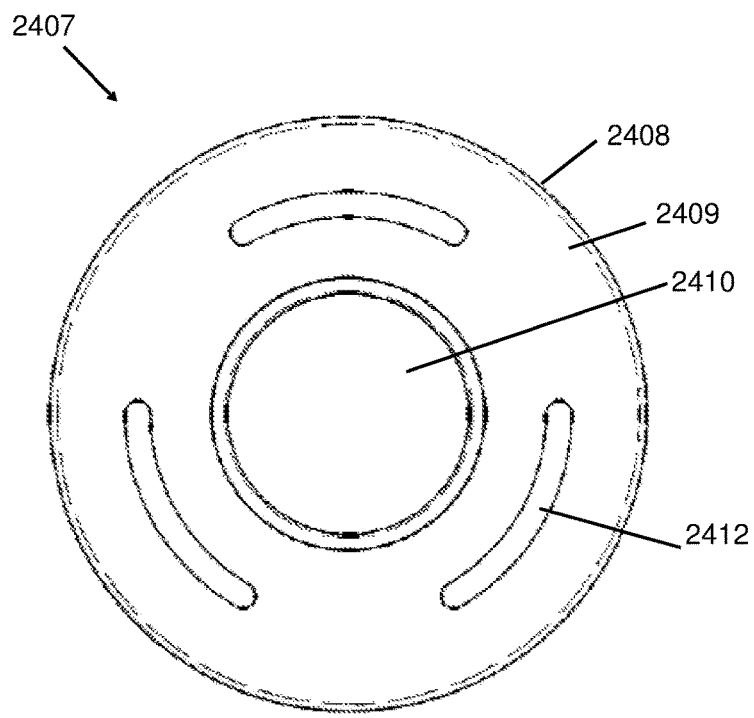
Figure 24D:
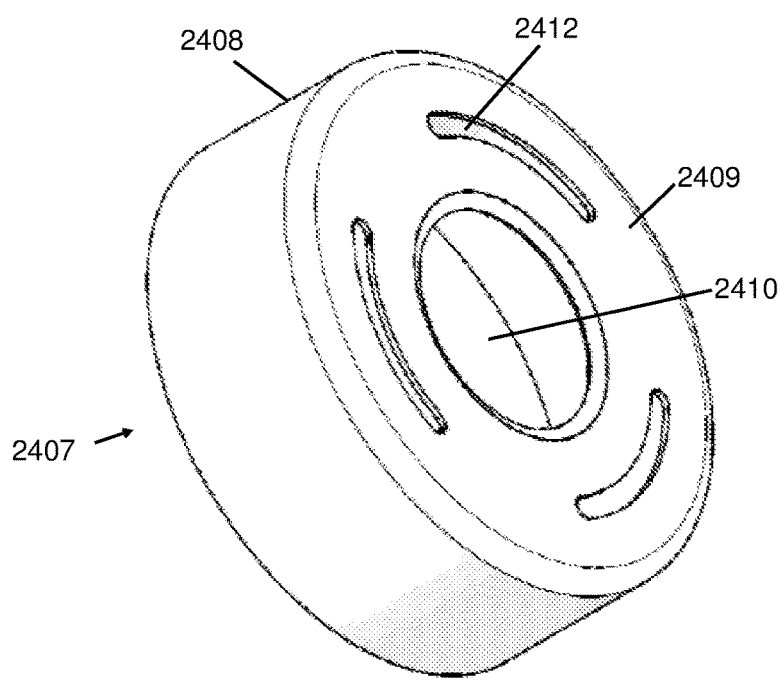

FIGS. 24C and 24D depict an alternate embodiment in which cap 2407 has a cap body 2408 having a top surface 2409 thereof and hole 2410 passing therethrough. The elongated openings are presented as scallops 2412 in this example and serve a purpose analogous to that described previously, enabling access to an underlying RFID ID in a liner on the underside of cap surface 2409 for interrogation or other purposes.

Figure 24E:
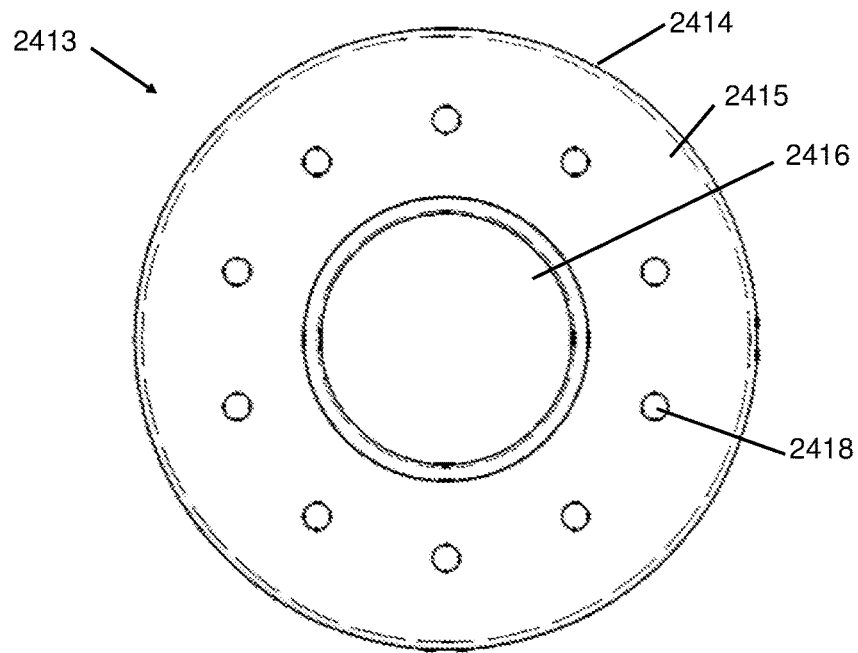
Figure 24F:
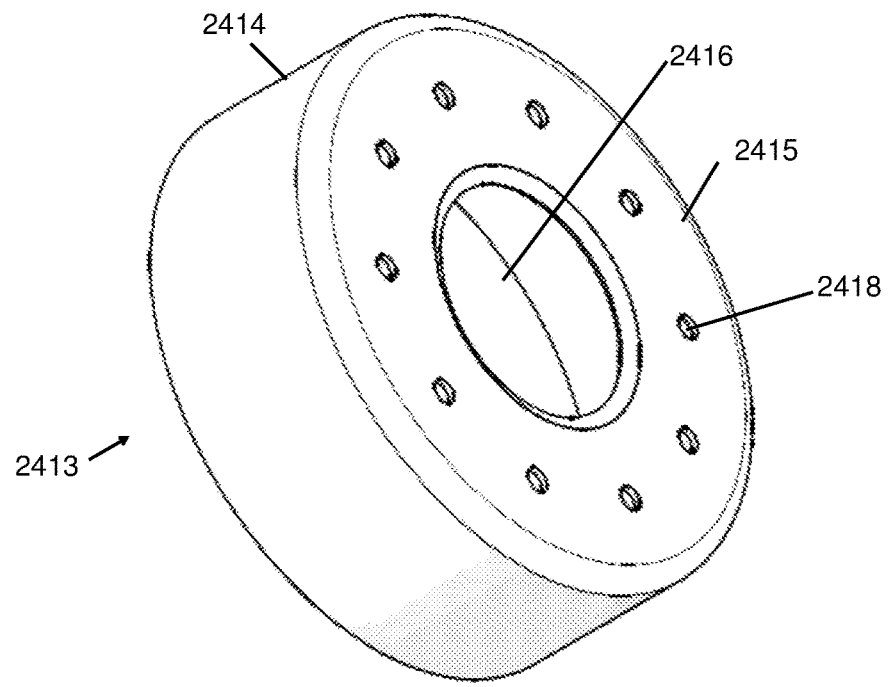

FIGS. 24E and 24F depict an yet another embodiment, in which cap 2413 has a cap body 2414 having a top surface 2415 thereof and hole 2416 passing therethrough. instead of elongated openings in the cap body, multiple holes 2418 are dispersed in top surface 2415 of cap 2413. In this example, holes 2418 are disposed in a circular configuration. The holes serve a purpose analogous to that described previously, enabling access to an underlying RFID ID in a liner on the underside of cap surface 2415 for interrogation or other purposes.

The number and orientation of the openings/holes through a top surface of a cap in accordance with aspects described herein may vary from the exampled of the drawings. They openings could instead be dispersed in any desired configuration. In general, one approach may be to dispose a minimum number of openings and/or minimize a total area encompassed by the openings but still enable reliable interrogation of an RFID tag of the container top assembly.

Those having ordinary skill in the art will recognize that aspects described herein may be embodied in one or more systems, one or more methods and/or one or more computer program products. In some embodiments, aspects described herein may be embodied entirely in hardware, entirely in software (for instance in firmware, resident software, microcode, etc.), or in a combination of software and hardware aspects that may all generally be referred to herein as a "system" and include circuit(s) and/or module(s). FIG. 4 and the accompany description above provide an example computer system to incorporate and use aspects described herein.

In some embodiments, aspects described herein may take the form of a computer program product embodied in one or more computer readable medium(s). The one or more computer readable medium(s) may have embodied thereon computer readable program code. Various computer readable medium(s) or combinations thereof may be utilized. For instance, the computer readable medium(s) may comprise a computer readable storage medium, examples of which include (but are not limited to) one or more electronic, magnetic, optical, or semiconductor systems, apparatuses, or devices, or any suitable combination of the foregoing. Example computer readable storage medium(s) include, for instance: an electrical connection having one or more wires, a portable computer diskette, a hard disk or mass-storage device, a random access memory (RAM), read-only memory (ROM), and/or erasable-programmable read-only memory such as EPROM or Flash memory, an optical fiber, a portable compact disc read-only memory (CD-ROM), an optical storage device, a magnetic storage device (including a tape device), or any suitable combination of the above. A computer readable storage medium is defined to comprise a tangible medium that can contain or store program code for use by or in connection with an instruction execution system, apparatus, or device, such as a processor. The program code stored in/on the computer readable medium therefore produces an article of manufacture (such as a "computer program product") including program code.

Figure 25:
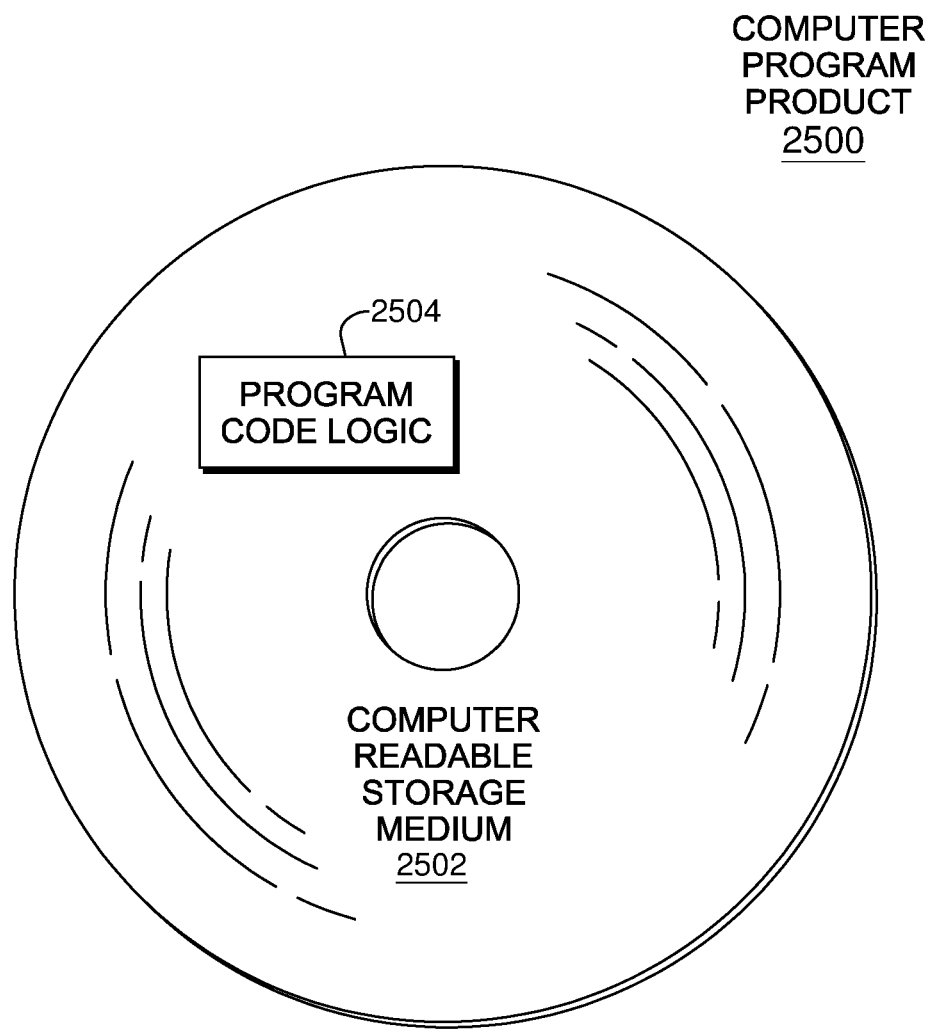
FIG. 25 depicts an example computer program product to incorporate aspects described herein.

Referring now to FIG. 25, in one example, a computer program product 2400 includes, for instance, one or more computer readable media 2502 to store computer readable program code means or logic 2504 thereon to provide and facilitate one or more aspects described herein.

Program code contained or stored in/on a computer readable medium can be obtained and executed by a data processing system (computer, computer system, etc. including a component thereof) and/or other devices to cause the data processing system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects described herein may be written in one or more programming languages. In some embodiments, the programming language(s) include object-oriented and/or procedural programming languages such as C, C++, C#, Java, etc. Program code may execute entirely on the user's computer, entirely remote from the user's computer, or a combination of partly on the user's computer and partly on a remote computer. In some embodiments, a user's computer and a remote computer are in communication via a network such as a local area network (LAN) or a wide area network (WAN), and/or via an external computer (for example, through the Internet using an Internet Service Provider).

In one example, program code includes one or more program instructions obtained for execution by one or more processors. Computer program instructions may be provided to one or more processors of, e.g., one or more data processing system, to produce a machine, such that the program instructions, when executed by the one or more processors, perform, achieve, or facilitate aspects described herein, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

The flowcharts and block diagrams depicted and described with reference to the Figures illustrate the architecture, functionality, and operation of possible embodiments of systems, methods and/or computer program products according to aspects described herein. These flowchart illustrations and/or block diagrams could, therefore, be of methods, apparatuses (systems), and/or computer program products according to aspects described herein.

In some embodiments, as noted above, each block in a flowchart or block diagram may represent a module, segment, or portion of code, which comprises one or more executable instructions for implementing the specified behaviors and/or logical functions of the block. Those having ordinary skill in the art will appreciate that behaviors/functions specified or performed by a block may occur in a different order than depicted and/or described, or may occur simultaneous to, or partially/wholly concurrent with, one or more other blocks. Two blocks shown in succession may, in fact, be executed substantially concurrently, or the blocks may sometimes be executed in the reverse order. Additionally, each block of the block diagrams and/or flowchart illustrations, and combinations of blocks in the block diagrams and/or flowchart illustrations, can be implemented wholly by special-purpose hardware-based systems, or in combination with computer instructions, that perform the behaviors/functions specified by a block or entire block diagram or flowchart.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A container top assembly comprising:
   a cap comprising a central hole and a plurality of openings;
   a liner; and
   a radio frequency identification (RFID) tag embedded at least partially within the container top assembly, the RFID tag configured at least partially underlying one or more openings of the plurality of openings for interrogation of the RFID tag.

2. The container top assembly of claim 1, wherein the plurality of openings are disposed in a circular configuration at least partially around the central hole of the cap.

3. The container top assembly of claim 1, wherein the plurality of openings comprise a plurality of elongated openings.

4. The container top assembly of claim 3, wherein the plurality of elongated openings are oriented radially around the central hole of the cap.

5. The container top assembly of claim 3, wherein the plurality of elongated openings are curved openings.

6. The container top assembly of claim 1, wherein the plurality of openings comprise at least 3 openings.

7. The container top assembly of claim 1, wherein the plurality of openings are disposed evenly-spaced around the central hole of the cap.

8. The container top assembly of claim 1, wherein the one or more openings are configured to enable interrogation of the RFID tag through the one or more openings.

9. The container top assembly of claim 1, wherein the plurality of openings are configured such that an area encompassed by the plurality of openings in a top surface of the cap is less than a total area of the top surface of the cap while enabling interrogation of the RFID tag.

10. The container top assembly of claim 1, wherein the RFID tag is ring-shaped and at least partially encircles the central hole of the cap.

11. The container top assembly of claim 1, wherein the RFID tag is embedded at least partially within the liner of the container top assembly.

12. The container top assembly of claim 11, wherein the liner comprises an elastomeric material in which the RFID tag is embedded.

13. The container top assembly of claim 1, wherein the liner comprises a septum.

14. The container top assembly of claim 1, wherein the cap is metal.

15. The container top assembly of claim 1, wherein the cap is made of a material impenetrable to radio frequency waves.

16. The container top assembly of claim 1, wherein the central opening extends through a top surface of the cap to the liner.

* * * * *